(12) United States Patent
Cray et al.

(10) Patent No.: US 9,824,704 B2
(45) Date of Patent: Nov. 21, 2017

(54) PARTIAL CURING OF A MICROACTUATOR MOUNTING ADHESIVE IN A DISK DRIVE SUSPENSION

(71) Applicant: Hutchinson Technology Incorporated, Hutchinson, MN (US)

(72) Inventors: Scott J. Cray, Winsted, MN (US); John L. Schumann, Litchfield, MN (US); Trent A. Johnson, Hutchinson, MN (US); Luke E. Rose, Hudson, WI (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 15/053,631

(22) Filed: Feb. 25, 2016

(65) Prior Publication Data
US 2016/0240218 A1 Aug. 18, 2016

Related U.S. Application Data

(62) Division of application No. 14/623,774, filed on Feb. 17, 2015, now Pat. No. 9,296,188.

(51) Int. Cl.
*G11B 5/48* (2006.01)
*B32B 37/12* (2006.01)

(52) U.S. Cl.
CPC ........ *G11B 5/4826* (2013.01); *B32B 37/1207* (2013.01); *G11B 5/483* (2015.09); *G11B 5/48* (2013.01)

(58) Field of Classification Search
CPC ..... G11B 5/48; G11B 5/4833; B32B 37/1207; B32B 2037/1215; B32B 2037/1223
See application file for complete search history.

(56) References Cited

U.S. PATENT DOCUMENTS 3,320,556 A 5/1967 Schneider
3,582,575 A 6/1971 Scofield
(Continued)

FOREIGN PATENT DOCUMENTS

EP 0591954 B1 4/1994
EP 0834867 B1 5/2007
(Continued)

OTHER PUBLICATIONS

"Calculating VLSI Wiring Capacitance", Jun. 1990, IBM Technical Disclosure Bulletin, vol. 33, Issue No. 1A, 2 pages.
(Continued)

*Primary Examiner* — Brian Miller
(74) *Attorney, Agent, or Firm* — Nixon Peabody LLP

(57) ABSTRACT

Various embodiments concern a method of attaching a microactuator to a flexure, depositing a wet mass of structural adhesive on the flexure, mounting the microactuator on the wet mass of structural adhesive, partially curing the mass of structural adhesive through a first application of curing energy, and depositing a mass of conductive adhesive on the flexure. The mass of conductive adhesive is deposited in contact with the mass of structural adhesive. The state of partial curing of the structural adhesive prevents the conductive adhesive from wicking between the flexure and the underside of the microactuator and displacing the structural adhesive which may otherwise result in shorting to a stainless steel layer of the flexure. The method further comprises fully curing the mass of structural adhesive and the conductive adhesive through a second application of curing energy.

3 Claims, 12 Drawing Sheets

(56) References Cited

U.S. PATENT DOCUMENTS

| | | |
|---|---|---|
| 3,862,522 A | 1/1975 | Mednick |
| 3,877,120 A | 4/1975 | Hikota et al. |
| 3,910,339 A | 10/1975 | Kramer |
| 4,014,257 A | 3/1977 | Bettenhausen |
| 4,168,214 A | 9/1979 | Fletcher et al. |
| 4,181,554 A | 1/1980 | Rich |
| 4,299,130 A | 11/1981 | Koneval |
| 4,418,239 A | 11/1983 | Larson et al. |
| 4,422,906 A | 12/1983 | Kobayashi |
| 4,659,438 A | 4/1987 | Kuhn et al. |
| 4,916,798 A | 4/1990 | Ballast |
| 5,140,288 A | 8/1992 | Grunwell |
| 5,189,779 A | 3/1993 | Fishel et al. |
| 5,212,847 A | 5/1993 | Melcher et al. |
| 5,275,076 A | 1/1994 | Greenwalt |
| 5,320,272 A | 6/1994 | Melton et al. |
| 5,321,568 A | 6/1994 | Hatam-Tabrizi |
| 5,333,085 A | 7/1994 | Prentice et al. |
| 5,427,848 A | 6/1995 | Baer et al. |
| 5,459,921 A | 10/1995 | Hudson et al. |
| 5,485,053 A | 1/1996 | Baz |
| 5,491,597 A | 2/1996 | Bennin et al. |
| 5,521,778 A | 5/1996 | Boutaghou et al. |
| 5,526,208 A | 6/1996 | Hatch et al. |
| 5,598,307 A | 1/1997 | Bennin |
| 5,608,590 A | 3/1997 | Ziegler et al. |
| 5,608,591 A | 3/1997 | Klaassen et al. |
| 5,631,786 A | 5/1997 | Erpelding |
| 5,636,089 A | 6/1997 | Jurgenson et al. |
| 5,651,723 A | 7/1997 | Bjornard et al. |
| 5,657,186 A | 8/1997 | Kudo et al. |
| 5,657,188 A | 8/1997 | Jurgenson et al. |
| 5,666,241 A | 9/1997 | Summers |
| 5,666,717 A | 9/1997 | Matsumoto et al. |
| 5,694,270 A | 12/1997 | Sone et al. |
| 5,712,749 A | 1/1998 | Gustafson |
| 5,714,444 A | 2/1998 | Yokouchi et al. |
| 5,717,547 A | 2/1998 | Young |
| 5,722,142 A | 3/1998 | Myers |
| 5,734,526 A | 3/1998 | Symons |
| 5,737,152 A | 4/1998 | Balakrishnan |
| 5,754,368 A | 5/1998 | Shiraishi et al. |
| 5,764,444 A | 6/1998 | Imamura et al. |
| 5,773,889 A | 6/1998 | Love et al. |
| 5,790,347 A | 8/1998 | Girard |
| 5,795,435 A | 8/1998 | Waters et al. |
| 5,796,552 A | 8/1998 | Akin, Jr. et al. |
| 5,805,382 A | 9/1998 | Lee et al. |
| 5,812,344 A | 9/1998 | Balakrishnan |
| 5,818,662 A | 10/1998 | Shum |
| 5,857,257 A | 1/1999 | Inaba |
| 5,862,010 A | 1/1999 | Simmons et al. |
| 5,862,015 A | 1/1999 | Evans et al. |
| 5,889,137 A | 3/1999 | Hutchings et al. |
| 5,892,637 A | 4/1999 | Brooks, Jr. et al. |
| 5,893,201 A | 4/1999 | Myers |
| 5,898,541 A | 4/1999 | Boutaghou et al. |
| 5,898,544 A | 4/1999 | Krinke et al. |
| 5,914,834 A | 6/1999 | Gustafson |
| 5,921,131 A | 7/1999 | Stange |
| 5,922,000 A | 7/1999 | Chodorow |
| 5,924,187 A | 7/1999 | Matz |
| 5,929,390 A | 7/1999 | Naito et al. |
| 5,956,212 A | 9/1999 | Zhu |
| 5,973,882 A | 10/1999 | Tangren |
| 5,973,884 A | 10/1999 | Hagen |
| 5,986,853 A | 11/1999 | Simmons et al. |
| 5,995,328 A | 11/1999 | Balakrishnan |
| 5,995,329 A | 11/1999 | Shiraishi et al. |
| 6,011,671 A | 1/2000 | Masse et al. |
| 6,029,334 A | 2/2000 | Hartley |
| 6,038,102 A | 3/2000 | Balakrishnan et al. |
| 6,046,887 A | 4/2000 | Uozumi et al. |
| 6,055,132 A | 4/2000 | Arya et al. |
| 6,063,228 A | 5/2000 | Sasaki et al. |
| 6,075,676 A | 6/2000 | Hiraoka et al. |
| 6,078,470 A | 6/2000 | Danielson et al. |
| 6,085,456 A | 7/2000 | Battaglia |
| 6,095,023 A | 8/2000 | Harada et al. |
| 6,108,175 A | 8/2000 | Hawwa et al. |
| 6,115,221 A | 9/2000 | Utsunomiya |
| 6,118,637 A | 9/2000 | Wright et al. |
| 6,144,531 A | 11/2000 | Sawai |
| 6,146,813 A | 11/2000 | Girard et al. |
| 6,156,982 A | 12/2000 | Dawson |
| 6,157,522 A | 12/2000 | Murphy et al. |
| 6,172,853 B1 | 1/2001 | Davis et al. |
| 6,181,520 B1 | 1/2001 | Fukuda |
| 6,195,227 B1 | 2/2001 | Fan et al. |
| 6,215,622 B1 | 4/2001 | Ruiz et al. |
| 6,215,629 B1 | 4/2001 | Kant et al. |
| 6,229,673 B1 | 5/2001 | Shinohara et al. |
| 6,233,124 B1 | 5/2001 | Budde et al. |
| 6,239,953 B1 | 5/2001 | Mei |
| 6,246,546 B1 | 6/2001 | Tangren |
| 6,246,552 B1 | 6/2001 | Soeno et al. |
| 6,249,404 B1 | 6/2001 | Doundakov et al. |
| 6,262,868 B1 | 7/2001 | Arya et al. |
| 6,275,358 B1 | 8/2001 | Balakrishnan et al. |
| 6,278,587 B1 | 8/2001 | Mei |
| 6,282,062 B1 | 8/2001 | Shiraishi |
| 6,289,564 B1 | 9/2001 | Novotny |
| 6,295,185 B1 | 9/2001 | Stefansky |
| 6,297,936 B1 | 10/2001 | Kant et al. |
| 6,300,846 B1 | 10/2001 | Brunker |
| 6,307,715 B1 | 10/2001 | Berding et al. |
| 6,308,483 B1 | 10/2001 | Romine |
| 6,320,730 B1 | 11/2001 | Stefansky et al. |
| 6,330,132 B1 | 12/2001 | Honda |
| 6,349,017 B1 | 2/2002 | Schott |
| 6,366,431 B1 | 4/2002 | Tsuchiya et al. |
| 6,376,964 B1 | 4/2002 | Young et al. |
| 6,380,483 B1 | 4/2002 | Blake |
| 6,381,821 B1 | 5/2002 | Panyon et al. |
| 6,387,111 B1 | 5/2002 | Barber |
| 6,396,667 B1 | 5/2002 | Zhang et al. |
| 6,399,899 B1 | 6/2002 | Ohkawa et al. |
| 6,400,532 B1 | 6/2002 | Mei |
| 6,404,594 B1 | 6/2002 | Maruyama et al. |
| 6,407,481 B1 | 6/2002 | Takeuchi et al. |
| 6,424,500 B1 | 7/2002 | Coon et al. |
| 6,445,546 B1 | 9/2002 | Coon |
| 6,459,549 B1 | 10/2002 | Tsuchiya et al. |
| 6,480,359 B1 | 11/2002 | Dunn et al. |
| 6,487,045 B1 | 11/2002 | Yanagisawa |
| 6,490,228 B2 | 12/2002 | Killam |
| 6,493,190 B1 | 12/2002 | Coon |
| 6,493,192 B2 | 12/2002 | Crane et al. |
| 6,498,704 B1 | 12/2002 | Chessman et al. |
| 6,501,625 B1 | 12/2002 | Boismier et al. |
| 6,539,609 B2 | 4/2003 | Palmer et al. |
| 6,549,376 B1 | 4/2003 | Scura et al. |
| 6,549,736 B2 | 4/2003 | Miyabe et al. |
| 6,563,676 B1 | 5/2003 | Chew et al. |
| 6,581,262 B1 | 6/2003 | Myers |
| 6,596,184 B1 | 7/2003 | Shum et al. |
| 6,597,541 B2 | 7/2003 | Nishida et al. |
| 6,600,631 B1 | 7/2003 | Berding et al. |
| 6,621,653 B1 | 9/2003 | Schirle |
| 6,621,658 B1 | 9/2003 | Nashif |
| 6,636,388 B2 | 10/2003 | Stefansaky |
| 6,639,761 B1 | 10/2003 | Boutaghou et al. |
| 6,647,621 B1 | 11/2003 | Roen et al. |
| 6,653,763 B2 | 11/2003 | Wang et al. |
| 6,661,617 B1 | 12/2003 | Hipwell, Jr. et al. |
| 6,661,618 B2 | 12/2003 | Fujiwara et al. |
| 6,704,157 B2 | 3/2004 | Himes et al. |
| 6,704,158 B2 | 3/2004 | Hawwa et al. |
| 6,704,165 B2 | 3/2004 | Kube et al. |
| 6,711,930 B2 | 3/2004 | Thom et al. |
| 6,714,384 B2 | 3/2004 | Himes et al. |
| 6,714,385 B1 | 3/2004 | Even et al. |
| 6,724,580 B2 | 4/2004 | Irie et al. |
| 6,728,057 B2 | 4/2004 | Putnam |

(56) References Cited

U.S. PATENT DOCUMENTS

| | | | |
|---|---|---|---|
| 6,728,077 B1 | 4/2004 | Murphy |
| 6,731,472 B2 | 5/2004 | Okamoto et al. |
| 6,735,052 B2 | 5/2004 | Dunn et al. |
| 6,735,055 B1 | 5/2004 | Crane et al. |
| 6,737,931 B2 | 5/2004 | Amparan et al. |
| 6,738,225 B1 | 5/2004 | Summers et al. |
| 6,741,424 B1 | 5/2004 | Danielson et al. |
| 6,751,062 B2 | 6/2004 | Kasajima et al. |
| 6,752,661 B2 | 6/2004 | Gu et al. |
| 6,760,182 B2 | 7/2004 | Bement et al. |
| 6,760,194 B2 | 7/2004 | Shiraishi et al. |
| 6,760,196 B1 | 7/2004 | Niu et al. |
| 6,762,913 B1 | 7/2004 | Even et al. |
| 6,765,761 B2 | 7/2004 | Arya |
| 6,771,466 B2 | 8/2004 | Kasajima et al. |
| 6,771,467 B2 | 8/2004 | Kasajima et al. |
| 6,789,593 B1 | 9/2004 | Aono et al. |
| 6,791,802 B2 | 9/2004 | Watanabe et al. |
| 6,796,018 B1 | 9/2004 | Thornton |
| 6,797,888 B2 | 9/2004 | Ookawa et al. |
| 6,798,597 B1 | 9/2004 | Aram et al. |
| 6,801,402 B1 | 10/2004 | Subrahmanyam et al. |
| 6,802,496 B1 | 10/2004 | Preta |
| 6,831,539 B1 | 12/2004 | Hipwell, Jr. et al. |
| 6,833,978 B2 | 12/2004 | Shum et al. |
| 6,839,204 B2 | 1/2005 | Shiraishi et al. |
| 6,841,737 B2 | 1/2005 | Komatsubara et al. |
| 6,856,075 B1 | 2/2005 | Houk et al. |
| 6,859,345 B2 | 2/2005 | Boutaghou et al. |
| 6,870,091 B2 | 3/2005 | Seidler |
| 6,882,506 B2 | 4/2005 | Yamaoka et al. |
| 6,891,700 B2 | 5/2005 | Shiraishi et al. |
| 6,898,042 B2 | 5/2005 | Subrahmanyan |
| 6,900,967 B1 | 5/2005 | Coon et al. |
| 6,922,305 B2 | 7/2005 | Price |
| 6,934,127 B2 | 8/2005 | Yao et al. |
| 6,942,817 B2 | 9/2005 | Yagi et al. |
| 6,943,991 B2 | 9/2005 | Yao et al. |
| 6,950,288 B2 | 9/2005 | Yao et al. |
| 6,961,221 B1 | 11/2005 | Niu et al. |
| 6,963,471 B2 | 11/2005 | Arai et al. |
| 6,975,488 B1 | 12/2005 | Kulangara et al. |
| 6,977,790 B1 | 12/2005 | Chen et al. |
| 7,006,331 B1 * | 2/2006 | Subrahmanyam ... G11B 5/4826 360/234.6 |
| 7,006,333 B1 | 2/2006 | Summers |
| 7,016,159 B1 | 3/2006 | Bjorstrom et al. |
| 7,020,949 B2 | 4/2006 | Muramatsu et al. |
| 7,023,667 B2 | 4/2006 | Shum |
| 7,050,267 B2 | 5/2006 | Koh et al. |
| 7,057,857 B1 | 6/2006 | Niu et al. |
| 7,064,928 B2 | 6/2006 | Fu et al. |
| 7,068,473 B2 | 6/2006 | O'Neill |
| 7,079,357 B1 | 7/2006 | Kulangara et al. |
| 7,082,670 B2 | 8/2006 | Boismier et al. |
| 7,092,215 B2 | 8/2006 | Someya et al. |
| 7,099,115 B2 | 8/2006 | Yao et al. |
| 7,099,117 B1 | 8/2006 | Subrahmanyam et al. |
| 7,129,418 B2 | 10/2006 | Aonuma et al. |
| 7,130,159 B2 | 10/2006 | Shimizu et al. |
| 7,132,607 B2 | 11/2006 | Yoshimi et al. |
| 7,142,395 B2 | 11/2006 | Swanson et al. |
| 7,144,687 B2 | 12/2006 | Fujisaki et al. |
| 7,158,348 B2 | 1/2007 | Erpelding et al. |
| 7,159,300 B2 | 1/2007 | Yao et al. |
| 7,161,765 B2 | 1/2007 | Ichikawa et al. |
| 7,161,767 B2 | 1/2007 | Hernandez et al. |
| 7,177,119 B1 | 2/2007 | Bennin et al. |
| 7,185,409 B2 | 3/2007 | Myers |
| 7,218,481 B1 | 5/2007 | Bennin et al. |
| 7,256,968 B1 | 8/2007 | Krinke |
| 7,271,958 B2 | 9/2007 | Yoon et al. |
| 7,283,331 B2 | 10/2007 | Oh et al. |
| 7,288,590 B2 | 10/2007 | Lechat et al. |
| 7,292,413 B1 | 11/2007 | Coon |
| 7,307,817 B1 | 12/2007 | Mei |
| 7,322,241 B2 | 1/2008 | Kai |
| 7,336,436 B2 | 2/2008 | Sharma et al. |
| 7,336,444 B2 | 2/2008 | Kido et al. |
| 7,338,693 B2 | 3/2008 | Shikano et al. |
| 7,342,750 B2 | 3/2008 | Yang et al. |
| 7,345,851 B2 | 3/2008 | Hirano et al. |
| 7,375,930 B2 | 5/2008 | Yang et al. |
| 7,379,274 B2 | 5/2008 | Yao et al. |
| 7,382,582 B1 | 6/2008 | Cuevas |
| 7,384,531 B1 | 6/2008 | Peltoma et al. |
| 7,385,788 B2 | 6/2008 | Kubota et al. |
| 7,388,733 B2 | 6/2008 | Swanson et al. |
| 7,391,594 B2 | 6/2008 | Fu et al. |
| 7,403,357 B1 | 7/2008 | Williams |
| 7,408,745 B2 | 8/2008 | Yao et al. |
| 7,417,830 B1 | 8/2008 | Kulangara |
| 7,420,778 B2 | 9/2008 | Sassine et al. |
| 7,459,835 B1 | 12/2008 | Mei et al. |
| 7,460,337 B1 | 12/2008 | Mei |
| 7,466,520 B2 | 12/2008 | White et al. |
| 7,499,246 B2 | 3/2009 | Nakagawa |
| 7,509,859 B2 | 3/2009 | Kai |
| 7,518,830 B1 | 4/2009 | Panchal et al. |
| 7,567,410 B1 | 7/2009 | Zhang et al. |
| 7,595,965 B1 | 9/2009 | Kulangara et al. |
| RE40,975 E | 11/2009 | Evans et al. |
| 7,625,654 B2 | 12/2009 | Vyas et al. |
| 7,629,539 B2 | 12/2009 | Ishii et al. |
| 7,636,222 B1 | 12/2009 | Dobosz et al. |
| 7,643,252 B2 | 1/2010 | Arai et al. |
| 7,649,254 B2 | 1/2010 | Graydon et al. |
| 7,663,841 B2 | 2/2010 | Budde et al. |
| 7,667,921 B2 | 2/2010 | Satoh et al. |
| 7,675,713 B2 | 3/2010 | Ogawa et al. |
| 7,688,552 B2 | 3/2010 | Yao et al. |
| 7,692,899 B2 | 4/2010 | Arai et al. |
| 7,697,237 B1 | 4/2010 | Danielson |
| 7,701,673 B2 | 4/2010 | Wang et al. |
| 7,701,674 B2 | 4/2010 | Arai |
| 7,710,687 B1 | 5/2010 | Carlson et al. |
| 7,710,688 B1 | 5/2010 | Hentges et al. |
| 7,719,798 B2 | 5/2010 | Yao |
| 7,724,476 B1 | 5/2010 | Bjorstrom et al. |
| 7,724,478 B2 | 5/2010 | Deguchi et al. |
| 7,751,153 B1 | 7/2010 | Kulangara et al. |
| 7,768,746 B2 | 8/2010 | Yao et al. |
| 7,782,572 B2 | 8/2010 | Pro |
| 7,804,663 B2 | 9/2010 | Hirano et al. |
| 7,813,083 B2 | 10/2010 | Guo et al. |
| 7,813,084 B1 | 10/2010 | Hentges |
| 7,821,742 B1 | 10/2010 | Mei |
| 7,826,177 B1 | 11/2010 | Zhang et al. |
| 7,832,082 B1 | 11/2010 | Hentges et al. |
| 7,835,113 B1 | 11/2010 | Douglas |
| 7,872,344 B2 | 1/2011 | Fjelstad et al. |
| 7,875,804 B1 | 1/2011 | Tronnes et al. |
| 7,902,639 B2 | 3/2011 | Garrou et al. |
| 7,914,926 B2 | 3/2011 | Kimura et al. |
| 7,923,644 B2 | 4/2011 | Ishii et al. |
| 7,924,530 B1 | 4/2011 | Chocholaty |
| 7,929,252 B1 | 4/2011 | Hentges et al. |
| 7,946,010 B1 | 5/2011 | Myers et al. |
| 7,983,008 B2 | 7/2011 | Liao et al. |
| 7,986,494 B2 | 7/2011 | Pro |
| 8,004,798 B1 | 8/2011 | Dunn |
| 8,072,708 B2 | 12/2011 | Horiuchi |
| 8,085,508 B2 * | 12/2011 | Hatch ............. G11B 5/4833 360/245.3 |
| 8,089,728 B2 | 1/2012 | Yao et al. |
| 8,120,878 B1 | 2/2012 | Drape et al. |
| 8,125,736 B2 | 2/2012 | Nojima et al. |
| 8,125,741 B2 | 2/2012 | Shelor |
| 8,144,430 B2 | 3/2012 | Hentges et al. |
| 8,144,436 B2 | 3/2012 | Iriuchijima et al. |
| 8,149,542 B2 | 4/2012 | Ando et al. |
| 8,149,545 B1 | 4/2012 | Chai et al. |
| 8,151,440 B2 | 4/2012 | Tsutsumi et al. |
| 8,154,827 B2 | 4/2012 | Contreras et al. |

(56) References Cited

U.S. PATENT DOCUMENTS

| | | |
|---|---|---|
| 8,157,947 B2 | 4/2012 | Kim |
| 8,161,626 B2 | 4/2012 | Ikeji |
| 8,169,746 B1 | 5/2012 | Rice et al. |
| 8,174,797 B2 | 5/2012 | Iriuchijima |
| 8,189,281 B2 | 5/2012 | Alex et al. |
| 8,189,301 B2 | 5/2012 | Schreiber |
| 8,194,359 B2 | 6/2012 | Yao et al. |
| 8,199,441 B2 | 6/2012 | Nojima |
| 8,199,442 B2 | 6/2012 | Okawara et al. |
| 8,228,642 B1 | 7/2012 | Hahn et al. |
| 8,233,240 B2 | 7/2012 | Contreras et al. |
| 8,248,731 B2 | 8/2012 | Fuchino |
| 8,248,734 B2 | 8/2012 | Fuchino |
| 8,248,735 B2 | 8/2012 | Fujimoto et al. |
| 8,248,736 B2 | 8/2012 | Hanya et al. |
| 8,254,062 B2 | 8/2012 | Greminger |
| 8,259,416 B1 | 9/2012 | Davis et al. |
| 8,264,797 B2 | 9/2012 | Emley |
| 8,284,524 B2 | 10/2012 | Meyer |
| 8,289,652 B2 | 10/2012 | Zambri et al. |
| 8,289,656 B1 | 10/2012 | Huber |
| 8,295,012 B1 | 10/2012 | Tian et al. |
| 8,296,929 B2 | 10/2012 | Hentges et al. |
| 8,300,362 B2 | 10/2012 | Virmani et al. |
| 8,300,363 B2 | 10/2012 | Arai et al. |
| 8,305,712 B2 | 11/2012 | Contreras et al. |
| 8,310,790 B1 | 11/2012 | Fanslau, Jr. |
| 8,331,061 B2 | 12/2012 | Hanya et al. |
| 8,339,748 B2 | 12/2012 | Shum et al. |
| 8,351,160 B2 | 1/2013 | Fujimoto |
| 8,363,361 B2 | 1/2013 | Hanya et al. |
| 8,369,046 B2 | 2/2013 | Nojima |
| 8,379,349 B1 | 2/2013 | Pro et al. |
| 8,405,933 B2 | 3/2013 | Soga |
| 8,405,934 B2 | 3/2013 | Fuchino |
| 8,446,694 B1 | 5/2013 | Tian et al. |
| 8,456,780 B1 | 6/2013 | Ruiz |
| 8,467,153 B1* | 6/2013 | Pan ............... G11B 5/4846 360/245.9 |
| 8,498,082 B1 | 7/2013 | Padeski et al. |
| 8,503,133 B2 | 8/2013 | Arai et al. |
| 8,508,888 B2 | 8/2013 | Ohsawa |
| 8,526,142 B1 | 9/2013 | Dejkoonmak et al. |
| 8,542,465 B2 | 9/2013 | Liu et al. |
| 8,553,364 B1 | 10/2013 | Schreiber et al. |
| 8,559,137 B2 | 10/2013 | Imuta |
| 8,582,243 B2 | 11/2013 | Feng et al. |
| 8,593,764 B1 | 11/2013 | Tian et al. |
| 8,593,765 B2* | 11/2013 | Uematsu ......... G11B 5/4873 360/234.5 |
| 8,630,067 B2 | 1/2014 | Ando et al. |
| 8,634,166 B2 | 1/2014 | Ohnuki et al. |
| 8,665,565 B2 | 3/2014 | Pro et al. |
| 8,665,567 B2 | 3/2014 | Shum et al. |
| 8,675,314 B1 | 3/2014 | Bjorstrom et al. |
| 8,681,456 B1* | 3/2014 | Miller ............. G11B 5/4826 360/245.3 |
| 8,717,712 B1 | 5/2014 | Bennin et al. |
| 8,730,621 B2* | 5/2014 | Brandts ............. H01R 43/02 360/264.2 |
| 8,741,195 B2 | 6/2014 | Kurihara et al. |
| 8,780,503 B2 | 7/2014 | Wright et al. |
| 8,792,214 B1* | 7/2014 | Bjorstrom ....... G11B 5/4833 360/245.8 |
| 8,834,660 B1 | 9/2014 | Scheele et al. |
| 8,885,297 B1 | 11/2014 | Bjorstrom et al. |
| 8,891,206 B2* | 11/2014 | Miller ............. G11B 5/4826 360/245 |
| 8,896,968 B2* | 11/2014 | Miller ............. G11B 5/4826 360/245 |
| 8,896,969 B1* | 11/2014 | Miller ............. G11B 5/4873 360/294.4 |
| 8,896,970 B1 | 11/2014 | Miller et al. |
| 8,921,707 B2* | 12/2014 | Ohnuki ............. H05K 1/05 174/257 |
| 9,007,726 B2 | 4/2015 | Bennin et al. |
| 9,036,302 B2 | 5/2015 | Bjorstrom et al. |
| 9,070,392 B1 | 6/2015 | Bjorstrom |
| 9,093,117 B2 | 7/2015 | Tobias |
| 9,117,468 B1 | 8/2015 | Zhang et al. |
| 9,147,413 B2 | 9/2015 | Miller et al. |
| 9,196,277 B2* | 11/2015 | Omachi ........... G11B 5/4833 |
| 9,224,410 B1* | 12/2015 | Ee ................. G11B 5/4826 |
| 9,240,203 B2 | 1/2016 | Miller et al. |
| 9,245,555 B2 | 1/2016 | Bennin et al. |
| 9,257,139 B2 | 2/2016 | Miller |
| 9,296,188 B1* | 3/2016 | Cray ............... B32B 37/1207 |
| 9,311,938 B1* | 4/2016 | Ee ................. G11B 5/483 |
| 9,318,136 B1 | 4/2016 | Bjorstrom et al. |
| 9,330,695 B1* | 5/2016 | Chen .............. G11B 5/48 |
| 9,330,697 B2 | 5/2016 | Miller et al. |
| 9,406,314 B1* | 8/2016 | Hahn ............... G11B 5/4873 |
| 9,679,593 B2* | 6/2017 | Berscheit .......... G11B 5/4846 |
| 2001/0001937 A1 | 5/2001 | Benes et al. |
| 2001/0012181 A1 | 8/2001 | Inoue et al. |
| 2001/0013993 A1 | 8/2001 | Coon |
| 2001/0030838 A1 | 10/2001 | Takadera et al. |
| 2001/0043443 A1 | 11/2001 | Okamoto et al. |
| 2002/0012194 A1 | 1/2002 | Inagaki et al. |
| 2002/0075606 A1 | 6/2002 | Nishida et al. |
| 2002/0118492 A1 | 8/2002 | Watanabe et al. |
| 2002/0149888 A1 | 10/2002 | Motonishi et al. |
| 2002/0159845 A1 | 10/2002 | Mikell |
| 2002/0168897 A1 | 11/2002 | Chang |
| 2002/0176209 A1 | 11/2002 | Schulz et al. |
| 2002/0178778 A1 | 12/2002 | Thom et al. |
| 2003/0011118 A1 | 1/2003 | Kasajima et al. |
| 2003/0011936 A1 | 1/2003 | Himes et al. |
| 2003/0051890 A1 | 3/2003 | Marshall |
| 2003/0053258 A1 | 3/2003 | Dunn et al. |
| 2003/0089520 A1 | 5/2003 | Ooyabu et al. |
| 2003/0128474 A1* | 7/2003 | Schulz ............. G11B 5/4853 360/245.9 |
| 2003/0135985 A1 | 7/2003 | Yao et al. |
| 2003/0174445 A1 | 9/2003 | Luo |
| 2003/0202293 A1 | 10/2003 | Nakamura et al. |
| 2003/0210499 A1 | 11/2003 | Arya |
| 2004/0007322 A1 | 1/2004 | Lechat et al. |
| 2004/0008449 A1 | 1/2004 | Girard |
| 2004/0027727 A1 | 2/2004 | Shimizu et al. |
| 2004/0027728 A1 | 2/2004 | Coffey et al. |
| 2004/0032093 A1 | 2/2004 | Razavi |
| 2004/0070884 A1 | 4/2004 | Someya et al. |
| 2004/0084198 A1 | 5/2004 | Seidler |
| 2004/0125508 A1 | 7/2004 | Yang et al. |
| 2004/0181932 A1 | 9/2004 | Yao et al. |
| 2004/0207957 A1 | 10/2004 | Kasajima et al. |
| 2004/0221447 A1 | 11/2004 | Ishii et al. |
| 2004/0250952 A1 | 12/2004 | Lechat et al. |
| 2004/0264056 A1 | 12/2004 | Jang et al. |
| 2005/0045914 A1 | 3/2005 | Agranat et al. |
| 2005/0060864 A1 | 3/2005 | Nikolaidis et al. |
| 2005/0061542 A1 | 3/2005 | Aonuma et al. |
| 2005/0063097 A1 | 3/2005 | Maruyama et al. |
| 2005/0101983 A1 | 5/2005 | Loshakove et al. |
| 2005/0105217 A1 | 5/2005 | Kwon et al. |
| 2005/0117257 A1 | 6/2005 | Thaveeprungsriporn et al. |
| 2005/0180053 A1 | 8/2005 | Dovek et al. |
| 2005/0254175 A1 | 11/2005 | Swanson et al. |
| 2005/0280944 A1 | 12/2005 | Yang et al. |
| 2006/0044698 A1 | 3/2006 | Hirano et al. |
| 2006/0077594 A1 | 4/2006 | White et al. |
| 2006/0181812 A1 | 8/2006 | Kwon et al. |
| 2006/0193086 A1 | 8/2006 | Zhu et al. |
| 2006/0209465 A1 | 9/2006 | Takikawa et al. |
| 2006/0238924 A1 | 10/2006 | Gatzen |
| 2006/0248702 A1 | 11/2006 | Nikolaidis et al. |
| 2006/0274452 A1 | 12/2006 | Arya |
| 2006/0274453 A1 | 12/2006 | Arya |
| 2006/0279880 A1 | 12/2006 | Boutaghou et al. |
| 2007/0005072 A1 | 1/2007 | Castillo et al. |
| 2007/0041123 A1 | 2/2007 | Swanson et al. |

(56) References Cited

U.S. PATENT DOCUMENTS

| | | |
|---|---|---|
| 2007/0133128 A1 | 6/2007 | Arai |
| 2007/0153430 A1 | 7/2007 | Park et al. |
| 2007/0223146 A1 | 9/2007 | Yao et al. |
| 2007/0227769 A1 | 10/2007 | Brodsky et al. |
| 2007/0253176 A1 | 11/2007 | Ishii et al. |
| 2008/0024928 A1 | 1/2008 | Yang |
| 2008/0024933 A1 | 1/2008 | Yao et al. |
| 2008/0071302 A1 | 3/2008 | Castillo et al. |
| 2008/0084638 A1 | 4/2008 | Bonin |
| 2008/0124842 A1 | 5/2008 | Wang et al. |
| 2008/0144225 A1 | 6/2008 | Yao et al. |
| 2008/0192384 A1 | 8/2008 | Danielson et al. |
| 2008/0198511 A1 | 8/2008 | Hirano et al. |
| 2008/0229842 A1 | 9/2008 | Ohtsuka et al. |
| 2008/0247131 A1 | 10/2008 | Hitomi et al. |
| 2008/0251201 A1 | 10/2008 | Sikkel et al. |
| 2008/0264557 A1 | 10/2008 | Kim |
| 2008/0272122 A1 | 11/2008 | Son |
| 2008/0273266 A1 | 11/2008 | Pro |
| 2008/0273269 A1 | 11/2008 | Pro |
| 2009/0027807 A1 | 1/2009 | Yao et al. |
| 2009/0080117 A1 | 3/2009 | Shimizu et al. |
| 2009/0135523 A1 | 5/2009 | Nishiyama et al. |
| 2009/0147407 A1 | 6/2009 | Huang et al. |
| 2009/0168249 A1 | 7/2009 | McCaslin et al. |
| 2009/0176120 A1 | 7/2009 | Wang |
| 2009/0183359 A1 | 7/2009 | Tsutsumi et al. |
| 2009/0190263 A1 | 7/2009 | Miura et al. |
| 2009/0244786 A1 | 10/2009 | Hatch |
| 2009/0284870 A1 | 11/2009 | Nojima et al. |
| 2009/0294740 A1 | 12/2009 | Kurtz et al. |
| 2010/0007993 A1 | 1/2010 | Contreras et al. |
| 2010/0067151 A1 | 3/2010 | Okaware et al. |
| 2010/0073825 A1 | 3/2010 | Okawara |
| 2010/0097726 A1 | 4/2010 | Greminger et al. |
| 2010/0142081 A1 | 6/2010 | Funabashi et al. |
| 2010/0143743 A1 | 6/2010 | Yamasaki et al. |
| 2010/0165515 A1 | 7/2010 | Ando |
| 2010/0165516 A1 | 7/2010 | Fuchino |
| 2010/0177445 A1 | 7/2010 | Fuchino |
| 2010/0195251 A1 | 8/2010 | Nojima et al. |
| 2010/0195252 A1 | 8/2010 | Kashima |
| 2010/0208390 A1 | 8/2010 | Hanya et al. |
| 2010/0208425 A1 | 8/2010 | Rapisarda |
| 2010/0220414 A1 | 9/2010 | Klarqvist et al. |
| 2010/0246071 A1 | 9/2010 | Nojima et al. |
| 2010/0271735 A1 | 10/2010 | Schreiber |
| 2010/0277834 A1 | 11/2010 | Nojima |
| 2010/0290158 A1 | 11/2010 | Hanya et al. |
| 2011/0013319 A1 | 1/2011 | Soga et al. |
| 2011/0058281 A1 | 3/2011 | Arai et al. |
| 2011/0058282 A1 | 3/2011 | Fujimoto et al. |
| 2011/0096438 A1 | 4/2011 | Takada et al. |
| 2011/0096440 A1 | 4/2011 | Greminger |
| 2011/0123145 A1 | 5/2011 | Nishio |
| 2011/0141624 A1 | 6/2011 | Fuchino et al. |
| 2011/0141626 A1 | 6/2011 | Contreras et al. |
| 2011/0159767 A1 | 6/2011 | Sakurai et al. |
| 2011/0228425 A1 | 9/2011 | Liu et al. |
| 2011/0242708 A1 | 10/2011 | Fuchino |
| 2011/0279929 A1 | 11/2011 | Kin |
| 2011/0299197 A1 | 12/2011 | Eguchi |
| 2011/0299288 A1 | 12/2011 | Rapisarda |
| 2012/0000376 A1 | 1/2012 | Kurihara et al. |
| 2012/0002329 A1 | 1/2012 | Shum et al. |
| 2012/0081813 A1 | 4/2012 | Ezawa et al. |
| 2012/0081815 A1 | 4/2012 | Arai et al. |
| 2012/0087041 A1 | 4/2012 | Ohsawa |
| 2012/0099226 A1 | 4/2012 | Zambri et al. |
| 2012/0113547 A1 | 5/2012 | Sugimoto |
| 2012/0180956 A1 | 7/2012 | Kim |
| 2012/0248759 A1 | 10/2012 | Feith |
| 2012/0276232 A1 | 11/2012 | Marczyk et al. |
| 2012/0279757 A1 | 11/2012 | Ishii et al. |
| 2012/0281316 A1 | 11/2012 | Fujimoto et al. |
| 2012/0285306 A1 | 11/2012 | Weibelt |
| 2013/0020112 A1 | 1/2013 | Ohsawa |
| 2013/0021698 A1 | 1/2013 | Greminger et al. |
| 2013/0047807 A1 | 2/2013 | Sotokawa et al. |
| 2013/0055561 A1 | 3/2013 | Tsutsumi et al. |
| 2013/0107488 A1 | 5/2013 | Arai |
| 2013/0176646 A1 | 7/2013 | Arai |
| 2013/0242434 A1 | 9/2013 | Bjorstrom et al. |
| 2013/0242436 A1 | 9/2013 | Yonekura et al. |
| 2013/0248231 A1 | 9/2013 | Tobias |
| 2013/0265674 A1 | 10/2013 | Fanslau |
| 2013/0279042 A1 | 10/2013 | Xiong et al. |
| 2014/0022670 A1 | 1/2014 | Takikawa et al. |
| 2014/0022671 A1 | 1/2014 | Takikawa et al. |
| 2014/0022674 A1 | 1/2014 | Takikawa et al. |
| 2014/0022675 A1 | 1/2014 | Hanya et al. |
| 2014/0063660 A1 | 3/2014 | Bjorstrom et al. |
| 2014/0078621 A1 | 3/2014 | Miller et al. |
| 2014/0085754 A1 | 3/2014 | Hanya et al. |
| 2014/0085755 A1 | 3/2014 | Hanya et al. |
| 2014/0098440 A1 | 4/2014 | Miller et al. |
| 2014/0146649 A1 | 5/2014 | Bennin et al. |
| 2014/0168821 A1 | 6/2014 | Miller |
| 2014/0198412 A1 | 7/2014 | Miller et al. |
| 2014/0216221 A1 | 8/2014 | Mashima |
| 2014/0362475 A1 | 12/2014 | Bjorstrom et al. |
| 2014/0362476 A1 | 12/2014 | Miller et al. |
| 2015/0016235 A1 | 1/2015 | Bennin et al. |
| 2015/0055254 A1 | 2/2015 | Bjorstrom et al. |
| 2015/0055255 A1 | 2/2015 | Bennin et al. |
| 2015/0055256 A1 | 2/2015 | Miller |
| 2015/0062758 A1 | 3/2015 | Miller et al. |
| 2015/0162033 A1 | 6/2015 | Miller et al. |
| 2015/0194170 A1 | 7/2015 | Roen |
| 2015/0194176 A1 | 7/2015 | Scheele et al. |
| 2015/0356987 A1 | 12/2015 | Bennin et al. |
| 2016/0171995 A1 | 6/2016 | Bjorstrom |
| 2016/0196843 A1 | 7/2016 | Bjorstrom et al. |

FOREIGN PATENT DOCUMENTS

| | | |
|---|---|---|
| JP | 9198825 A | 7/1997 |
| JP | 10003632 A | 1/1998 |
| JP | 2001057039 A | 2/2001 |
| JP | 2001202731 A | 7/2001 |
| JP | 2001307442 A | 11/2001 |
| JP | 2002050140 A | 2/2002 |
| JP | 2002170607 A | 6/2002 |
| JP | 2003223771 A | 8/2003 |
| JP | 2003234549 A | 8/2003 |
| JP | 2004039056 A | 2/2004 |
| JP | 2004300489 A | 10/2004 |
| JP | 2005209336 A | 8/2005 |
| JP | 2007115864 A | 5/2007 |
| JP | 2008276927 A | 11/2008 |
| JP | 2015130221 A | 7/2015 |
| JP | 2015130225 A | 7/2015 |
| WO | WO9820485 A1 | 5/1998 |
| WO | 2014021440 A1 | 2/2014 |
| WO | WO2014190001 A1 | 11/2014 |
| WO | 2015009733 A1 | 1/2015 |
| WO | 2015027034 A2 | 2/2015 |

OTHER PUBLICATIONS

3M Ultra_pure Viscoelastic Damping Polymer 242NR01, Technical Data, Mar. 2012, 4 pages.

Cheng, Yang-Tse, "Vapor deposited thin gold coatings for high temperature electrical contacts", Electrical Contacts, 1996, Joint with the 18th International Conference on Electrical Contacts, Proceedings of the Forty-Second IEEE Holm Conference, Sep. 16-20, 1996 (abstract only).

Fu, Yao, "Design of a Hybrid Magnetic and Piezoelectric Polymer Microactuator", a thesis submitted to Industrial Research Institute Swinburne (IRIS), Swinburne University of Technology, Hawthorn, Victoria , Australia, Dec. 2005.

(56) References Cited

OTHER PUBLICATIONS

Harris, N.R. et al., "A Multilayer Thick-film PZT Actuator for MEMs Applications", Sensors and Actuators A: Physical, vol. 132, No. 1, Nov. 8, 2006, pp. 311-316.

Hentges, Reed T. et al., "Exploring Low Loss Suspension Interconnects for High Data Rates in Hard Disk Drives", IEEE Transactions on Magnetics, vol. 44, No. 1, Jan. 2008, pp. 169-174.

Jing, Yang, "Fabrication of piezoelectric ceramic micro-actuator and its reliability for hard disk drives", Ultrasonics, Ferroelectrics and Frequency Control, IEEE, vol. 51, No. 11, Nov. 2004, pp. 1470-1476 (abstract only).

Kon, Stanley et al., "Piezoresistive and Piezoelectric MEMS Strain Sensors for Vibration Detection", Sensors and Smart Structures Technologies for Civil, Mechanical, and Aerospace Systems 2007, Proc. of SPIE vol. 6529.

Lengert, David et al., "Design of suspension-based and collocated dual stage actuated suspensions", Microsyst Technol (2012) 18:1615-1622.

Li, Longqiu et al., "An experimental study of the dimple-gimbal interface in a hard disk drive", Microsyst Technol (2011) 17:863-868.

Pichonat, Tristan et al., "Recent developments in MEMS-based miniature fuel cells", Microsyst Technol (2007) 13:1671-1678.

Pozar, David M. Microwave Engineering, 4th Edition, copyright 2012 by John Wiley & Sons, Inc., pp. 422-426.

Raeymaekers, B. et al., "Investigation of fretting wear at the dimple/gimbal interface in a hard disk drive suspension", Wear, vol. 268, Issues 11-12, May 12, 2010, pp. 1347-1353.

Raeymaekers, Bart et al., "Fretting Wear Between a Hollow Sphere and Flat Surface", Proceedings of the STLE/ASME International Joint Tribology Conference, Oct. 19-21, 2009, Memphis, TN USA, 4 pages.

Rajagopal, Indira et al., "Gold Plating of Critical Components for Space Applications: Challenges and Solutions", Gold Bull., 1992, 25(2), pp. 55-66.

Yoon, Wonseok et al., "Evaluation of coated metallic bipolar plates for polymer electrolyte membrane fuel cells", The Journal of Power Sources, vol. 179, No. 1, Apr. 15, 2008, pp. 265-273.

\* cited by examiner

PARTIAL CURING OF A MICROACTUATOR MOUNTING ADHESIVE IN A DISK DRIVE SUSPENSION

CROSS REFERENCE TO RELATED APPLICATION

This application is a division of U.S. application Ser. No. 14/623,774, filed Feb. 17, 2015, entitled PARTIAL CURING OF A MICROACTUATOR MOUNTING ADHESIVE IN A DISK DRIVE SUSPENSION, which is hereby incorporated by reference in its entirety and for all purposes.

TECHNICAL FIELD

The present invention relates to disk drives and suspensions for disk drives. In particular, the invention is a dual stage actuation (DSA) suspension.

BACKGROUND

Dual stage actuation (DSA) disk drive head suspensions and disk drives incorporating DSA suspensions are generally known and commercially available. For example, DSA suspensions having an actuation structure on the baseplate or other mounting portion of the suspension, i.e., proximal to the spring or hinge region of the suspension, are described in U.S. Patent Publication No. 2010/0067151 to Okawara, U.S. Patent Publication No. 2012/0002329 to Shum, U.S. Patent Publication No. 2011/0242708 to Fuchino, and U.S. Pat. No. 5,714,444 to Imamura. DSA suspensions having actuation structures located on the loadbeam or gimbal portions of the suspension, i.e., distal to the spring or hinge region, are also known and disclosed, for example, in U.S. Pat. No. 5,657,188 to Jurgenson, U.S. Pat. No. 7,256,968 to Krinke, and U.S. Patent Publication No. 2008/0144225 to Yao. Co-located gimbal-based DSA suspensions are disclosed U.S. Pat. No. 8,681,456 to Miller, U.S. Pat. No. 8,891,206 to Miller, and U.S. Patent Publication No. 2014/0098440 to Miller. Each of the above-identified patents and patent applications is incorporated herein by reference in its entirety for all purposes.

There remains a continuing need for improved performance of DSA suspensions.

SUMMARY

Various embodiments concern a method of attaching a microactuator to a flexure. The method comprises depositing a mass of structural adhesive on a first surface of the flexure, the mass of structural adhesive applied in a wet state. The method further comprises mounting the microactuator over the flexure such that the structural adhesive, while in the wet state, is located between and in contact with each of the first surface of the flexure and a surface of the microactuator. The method further comprises partially curing the mass of structural adhesive through a first application of curing energy to the mass of structural adhesive while in the wet state. The method further comprises depositing a mass of conductive adhesive on the flexure, the mass of conductive adhesive deposited so as to contact each of a second surface of the flexure, a first terminal of the microactuator, and the mass of structural adhesive while in the partially cured state. The method further comprises fully curing the mass of structural adhesive and the conductive adhesive through a second application of curing energy.

Various embodiments concern a flexure assembly comprising a flexure having a first surface and a second surface. The flexure assembly further comprises a mass of structural adhesive disposed on the first surface, the mass of structural adhesive partially cured, the mass of structural adhesive non-conductive. The flexure assembly further comprises a microactuator mounted on the flexure, the microactuator having a bottom side and a terminal, the bottom side in contact with the mass of structural adhesive. The flexure assembly further comprises a mass of conductive adhesive disposed on the second surface, the mass of conductive adhesive in contact with the terminal and the mass of structural adhesive, the mass of conductive adhesive in a wet state.

Various embodiments concern a method of attaching a microactuator to a flexure. The method comprises depositing a mass of structural adhesive on the flexure, the mass of structural adhesive applied in a wet state, the mass of structural adhesive non-conductive. The method further comprises mounting the microactuator over the flexure by bringing an underside of the microactuator in contact with the mass of structural adhesive in the wet state. The method further comprises partially curing the mass of structural adhesive through a first application of curing energy to the mass of structural adhesive while in the wet state. The method further comprises depositing a mass of conductive adhesive on the flexure, the mass of conductive adhesive in contact with the mass of structural adhesive, the mass of conductive adhesive applied in a wet state, wherein the state of partial curing of the structural adhesive prevents the conductive adhesive from wicking between the flexure and the underside of the microactuator and displacing the structural adhesive. The method further comprises fully curing the mass of structural adhesive and the conductive adhesive through a second application of curing energy.

Further features and modifications of the various embodiments are further discussed herein and shown in the drawings. While multiple embodiments are disclosed, still other embodiments of the present disclosure will become apparent to those skilled in the art from the following detailed description, which shows and describes illustrative embodiments of this disclosure. Accordingly, the drawings and detailed description are to be regarded as illustrative in nature and not restrictive.

While multiple embodiments are disclosed, still other embodiments within the scope of the present disclosure will become apparent to those skilled in the art from the following detailed description, which shows and describes illustrative embodiments. Accordingly, the drawings and detailed description are to be regarded as illustrative in nature and not restrictive.

DESCRIPTION OF THE INVENTION

Figure 1:
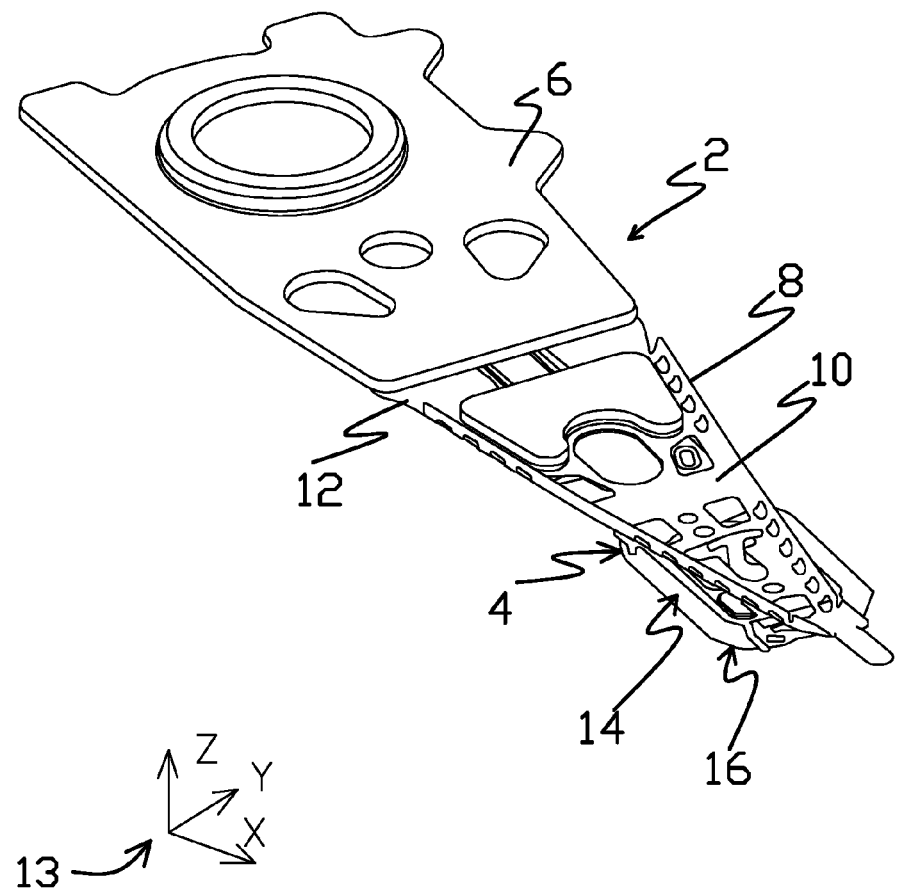
FIG. 1 is a perspective view of the loadbeam side of a suspension having a flexure with a dual stage actuation (DSA) structure.

FIG. 1 is a perspective view of the loadbeam side of a suspension 2 having a flexure 4 with a co-located or gimbal-based dual stage actuation (DSA) structure. As shown in FIG. 1, the suspension 2 includes a baseplate 6 as a proximal mounting structure. The suspension 2 includes a loadbeam 8 having a rigid or beam region 10 coupled to the baseplate 6 along a spring or hinge region 12. The loadbeam 8 can be formed from stainless steel. The flexure 4 includes a gimbal 14 at the distal end of the flexure 4. A DSA structure 16 is located on the gimbal 14, adjacent the distal end of the loadbeam 8. Proximal and distal, as used herein, refers to the relative direction along the longitudinal axis of the suspension 2. For example, the baseplate 6 is proximal of the loadbeam 8. An axes key 13 indicates X, Y, and Z axes in FIG. 1 and in subsequent FIGS. The suspension 2 is generally elongated along the X axis in distal and proximal directions. Lateral, as used herein, refers to the left and right directions, along the Y axis, and orthogonal to the longitudinal axis of the suspension 2. The suspension 2, including the flexure 4, are generally co-planar with an X-Y plane defined by the X and Y axes. The Z axis represents height as well as bottom and top orientations.

Figure 2:
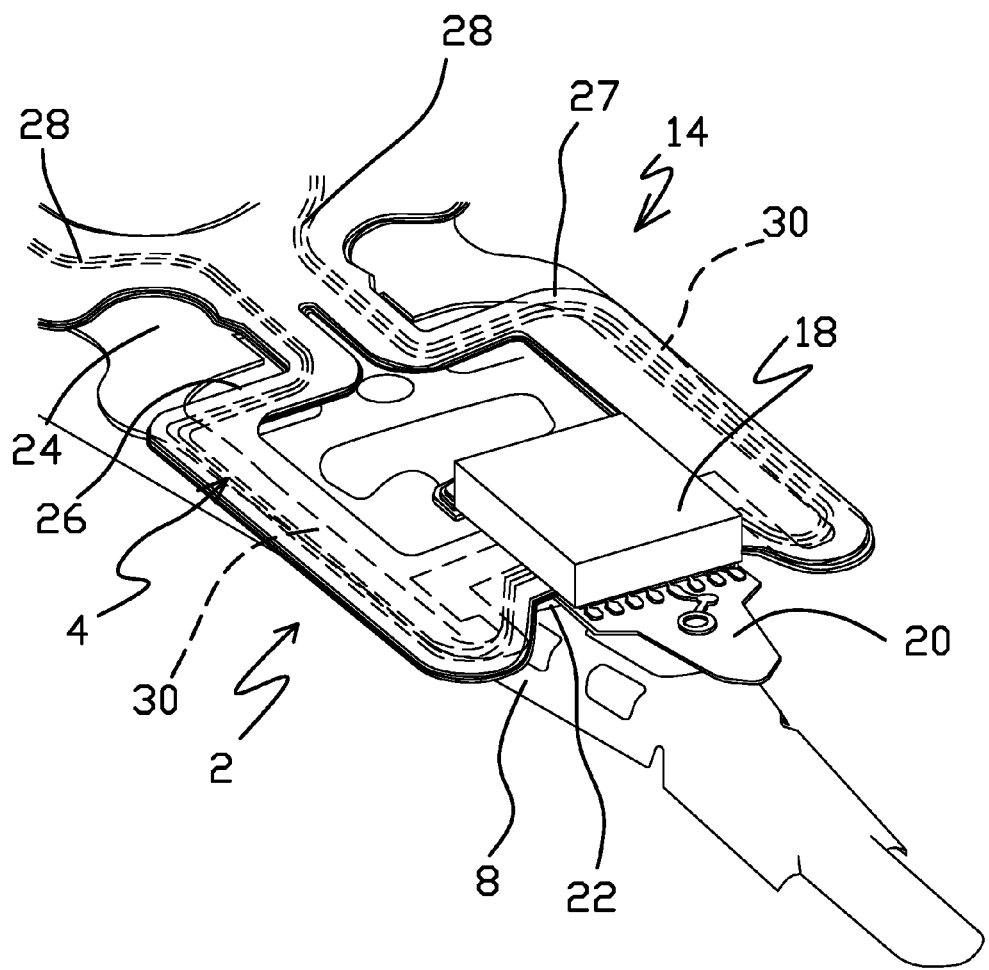
FIG. 2 is a perspective view of the flexure side (i.e., the side opposite that shown in FIG. 1) of the distal end of the suspension shown in FIG. 1.

FIG. 2 is a detailed perspective view of the flexure side of the distal end of the suspension 2. FIG. 2 shows the opposite side of the suspension 2 relative to FIG. 1. A head slider 18 is mounted to a tongue 20 of the gimbal 14, on the side of the suspension 2 that is opposite the loadbeam 8. The slider 18 is mounted to a slider mounting region of the tongue 20. The slider mounting is a surface of the tongue 20 to which the slider 18 (or component to which the slider 18 is attached) can be attached, such as with an adhesive such as epoxy. It will be understood that the slider 18 can be attached to a different portion of the gimbal 14. FIG. 2 further shows a microactuator 22 mounted on the gimbal 14.

The flexure 4 is composed of several layers. The flexure 4 includes a stainless steel layer 24. The stainless steel layer 24 can serve as a structural backbone to the flexure 4. Metals other than stainless steel can be used in place of stainless steel. The stainless steel layer 24 can include spring arms 30. The stainless steel layer 24 includes a tongue 20. The tongue 20 can be supported by the spring arms 30. As shown in FIG. 2, the tongue 20 is located between the spring arms 30.

The flexure 4 includes an insulated circuit layer 26. The insulated circuit layer 26 can be attached to the stainless steel layer 24. The insulated circuit layer 26 can extend as a plane that is parallel with the plane of the stainless steel layer 24. The insulated circuit layer 26 can extend off of the stainless steel layer 24 at various locations, such as in a flying lead segment. The insulated circuit layer 26 can comprise a plurality of traces 28 insulated by one or more layers of insulation material 27 (e.g., polyimide or other dielectric). For example, top and bottom layers of insulation material 27 can sandwich the plurality of traces 28 to electrically insulate the plurality of traces 28, and the top and bottom layers of insulation material 27 defining top and bottom surfaces of the insulated circuit layer 26. The traces 28 can be formed from copper or another conductive material. The insulation material 27 can be polyimide or another polymer. The traces 28 can electrically connect proximally with control circuitry of a disk drive as in known in the art. The traces 28 can electrically connect distally to various components, such as the microactuator 22. The slider 18 can be electrically connected with one or more of the traces 28 for transmitting read and write signal along the suspension 2.

Figure 3:
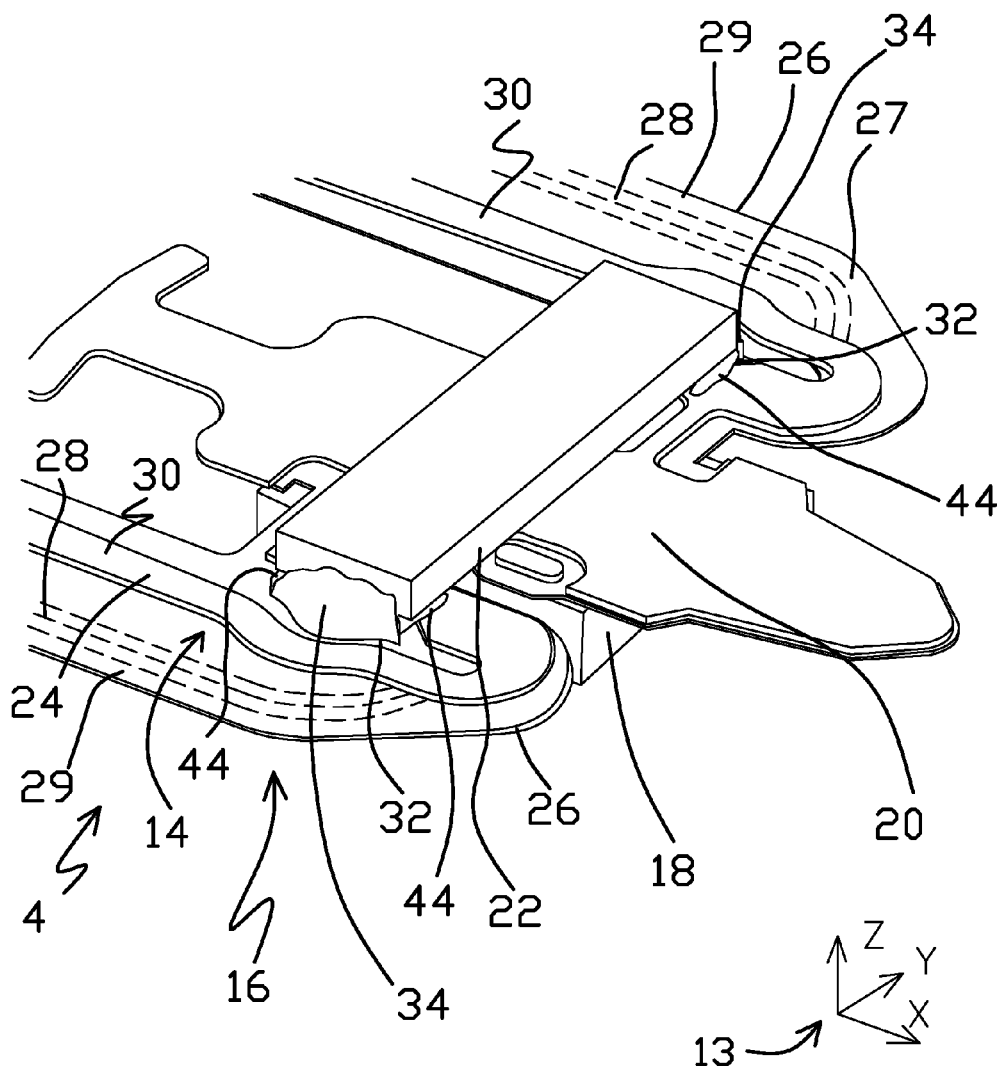
FIG. 3 is a perspective view of the stainless steel side of the distal end of a flexure with parts of the suspension removed from view to highlight the DSA structure having a microactuator.

FIG. 3 is a perspective view of the stainless steel side of the distal end of a flexure 4 with parts of the suspension 2 removed from view to highlight the DSA structure 16. The DSA structure 16 includes the microactuator 22 mounted to the gimbal 14 of the flexure 4 between the loadbeam 8 (not shown in FIG. 3) and the head slider 18. In response to electrical drive signals applied to the microactuator 22, the microactuator 22 drives portions of the gimbal 14, including the tongue 20 and slider 18, about a generally transverse tracking axis.

As shown in FIG. 2, the insulated circuit layer 26 can include arms 29 underneath spring arms 30 of the stainless steel layer 24. The arms 29 can be on opposite lateral sides of the tongue 20. The flexure 4 includes terminal pads 32. More specifically, the terminal pads 32 can be mounted on the arms 29 of the insulated circuit layer 26. The terminal pads 32 can be formed from metal (e.g., copper) and exposed though the insulation material 27 of the insulated circuit layer 26 to provide access for respective masses of conductive adhesive 34 to make electrical connections with the traces 28. As further shown herein, the microactuator 22 can be mounted, at least in part, on the terminal pads 32. The masses of conductive adhesive 34 can connect with respective anode and cathode terminals of the microactuator 22. The masses of conductive adhesive 34 can mechanically support the microactuator 22 on the flexure 4. The masses of conductive adhesive 34 can comprise conductive epoxy (e.g., silver filled), among other options. One option for the conductive adhesive is HENKEL™ ABLESTIK™ MA-2 epoxy. The terminal pads 32 are typically not electrically connected with the stainless steel layer 24.

The microactuator 22 is supported of the flexure 4 by a pair of masses of structural adhesive 44. The masses of structural adhesive 44 are located between, and in contact with, the microactuator 22 and the flexure 4. As shown, the pair of masses of structural adhesive 44 can be positioned laterally inward from the terminal pads 32. One option for the structural adhesive is HENKEL™ ABLESTIK™ 20-35 ST epoxy.

In FIG. 3, the microactuator 22 is in a neutral, undriven state in which no tracking drive signal is applied to the microactuator 22. In use, a first drive signal is applied across the microactuator 22 via the traces 28 and the masses of conductive adhesive 34. The first drive signal (e.g., having a first polarity) causes the shape of the microactuator 22 to change. More specifically, the length of the microactuator 22 generally expands (e.g., along the Y axis). The expansion of the microactuator 22 mechanically causes the tongue 20, and the slider 18 mounted thereon, to deflect in a first direction about an axis of rotation. The axis of rotation is generally parallel with the Z axis. Application of a second drive signal in the same manner, but having an opposite polarity with respect to the first drive signal, causes the microactuator 22 to generally contract. The contraction of the microactuator 22 mechanically causes the tongue 20, and the slider 18 mounted thereon, to deflect in a second direction about the axis of rotation, the second direction opposite the first direction. Rotation of the tongue 20 by actuation of the microactuator 22 rotates the slider mounting, and thereby the slider 18, about a tracking axis.

Figure 4:
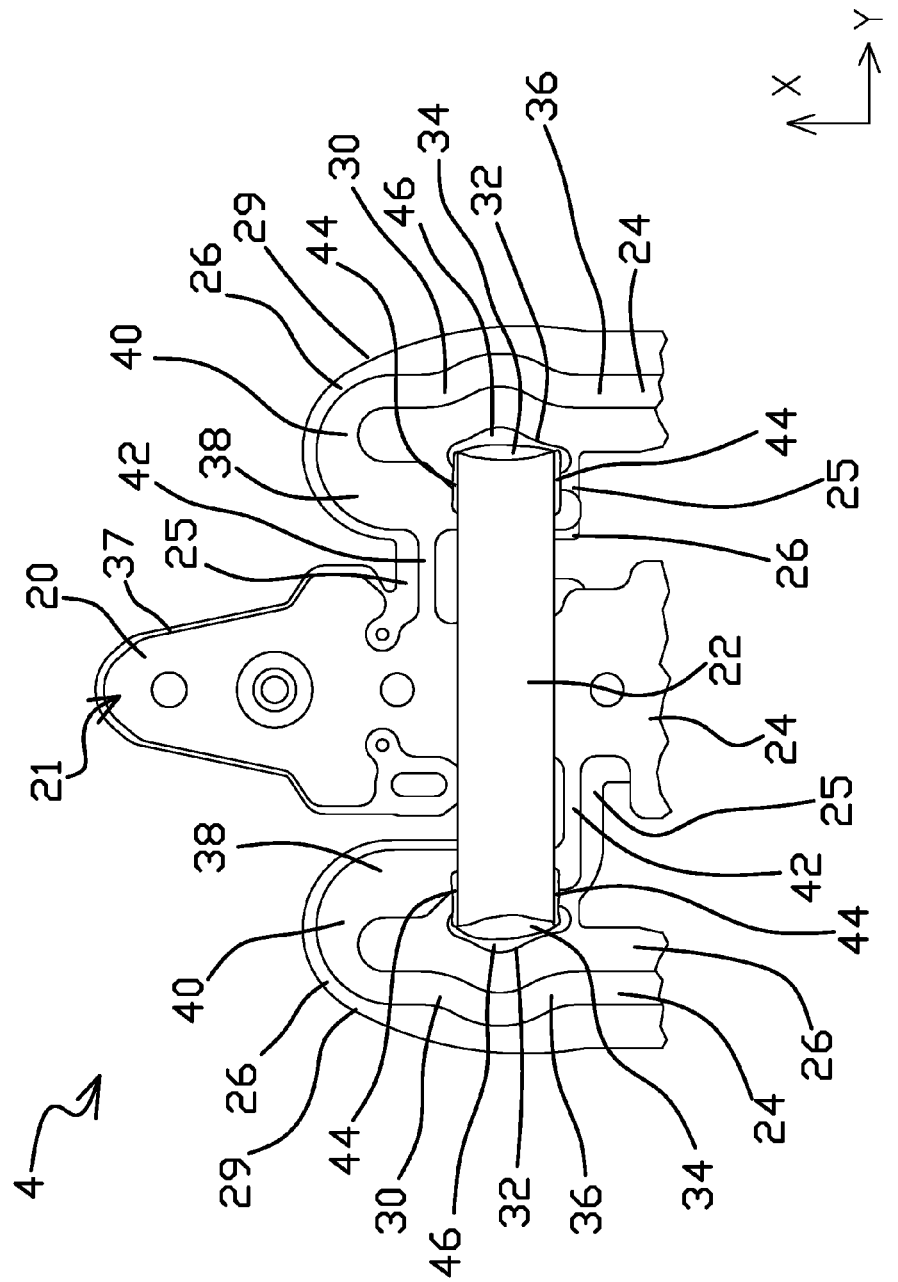
FIG. 4 is an overhead view of the distal end of the flexure with a microactuator.
Figure 5:
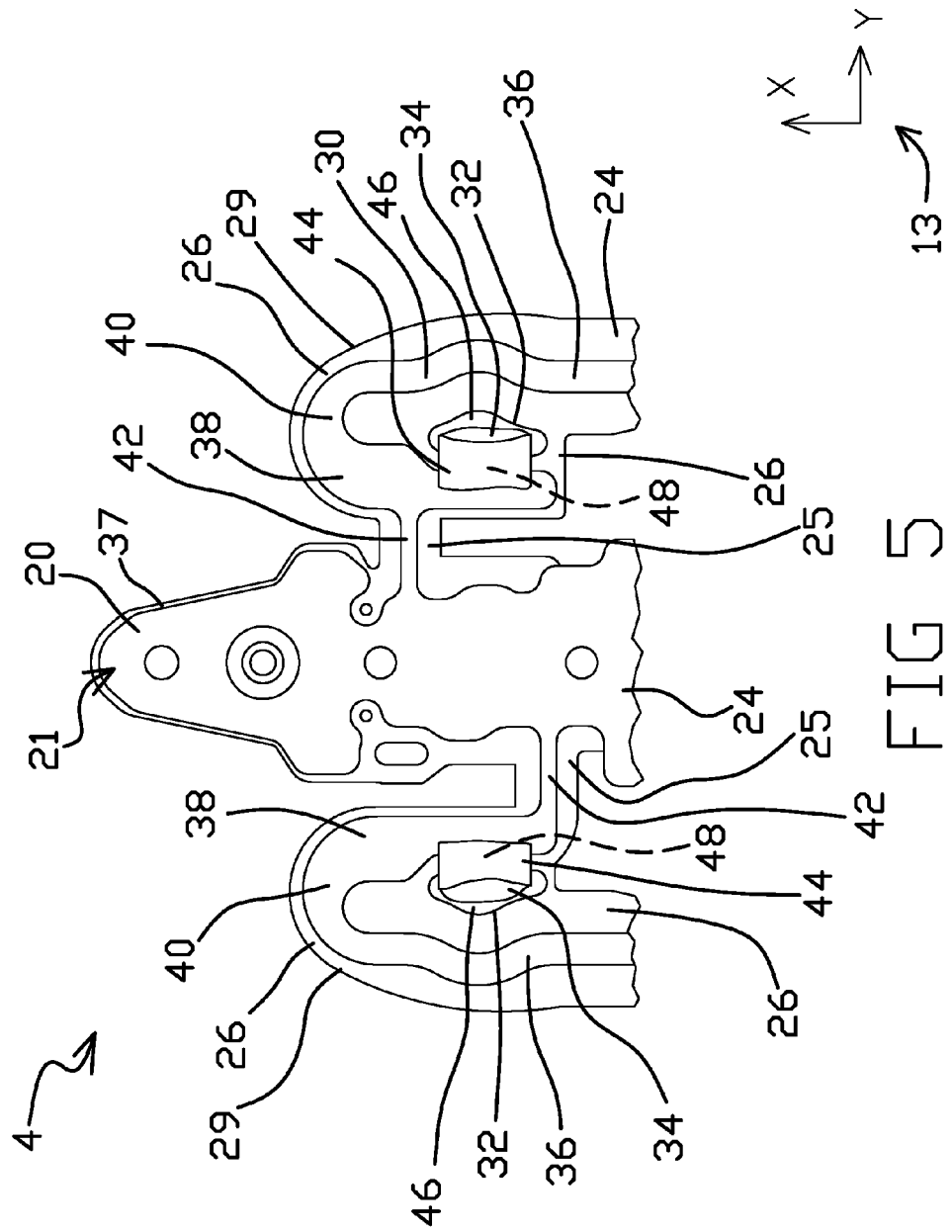
FIG. 5 is the same overhead view as in FIG. 4 but with the microactuator removed to show detail.
Figure 6:
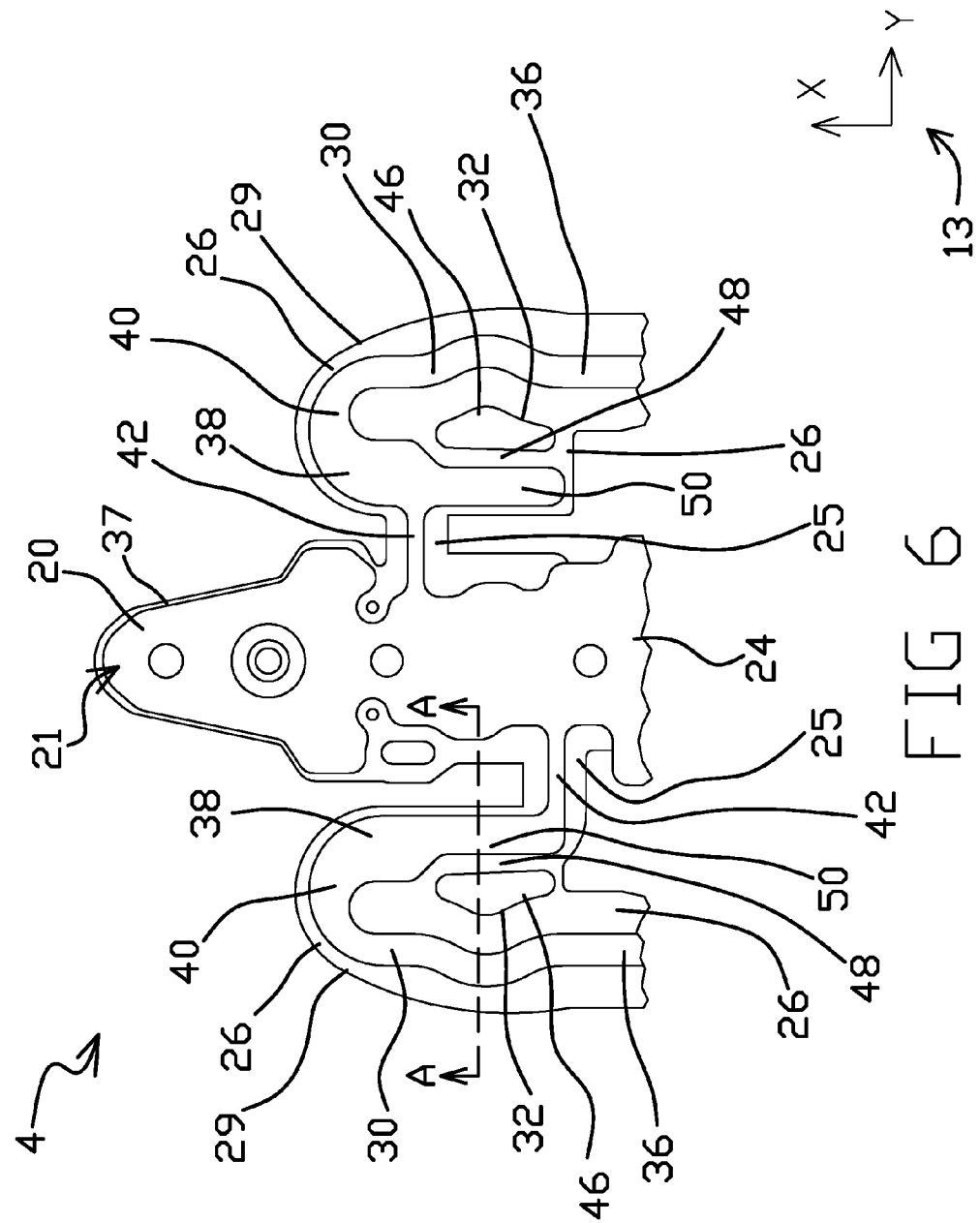
FIG. 6 is the same overhead view as in FIG. 5 but with adhesives removed to show detail.

FIGS. 4-6 are overhead views of the top side 21 of the flexure 4 with various components removed to show detail. FIG. 4 is an overhead of the microactuator 22 mounted on the flexure 4. The overhead view of FIG. 4 shows the spring arms 30 of the stainless steel layer 24. Each spring arm 30 includes an outer portion 36, an inner portion 38, and a distal bend 40 that connects the outer portion 36 to the inner portion 38. As shown, the outer portions 36 extend generally along a proximal-distal axis (the X axis), the spring arms 30 curve inward at the distal bends 40 such that the spring arms 30 make a 180° turn into the inner portions 38. The inner portions 38 can also be orientated to extend along the proximal-distal axis (the X axis). It is noted that the inner portions 38 are laterally inside of the outer portions 36. The stainless steel layer 24 includes struts 42 that extend inward from the inner portions 38 of the spring arms 30 to structurally support the tongue 20. The struts 42 may be the only portions of the stainless steel layer 24 that directly connect to the tongue 20.

The insulated circuit layer 26 can include arms 29 underneath the spring arms 30 of the stainless steel layer 24. The arms 29 can be on opposite lateral sides of the tongue 20. The arms 29 of the insulated circuit layer 26 can include strut sections 25. The strut sections 25 extend inward to connect with a tongue portion 37 of the insulated circuit layer 26. The strut sections 25 run underneath the struts 42 of the stainless steel layer 24, parallel with the Y axis. The tongue portion 37 of the insulated circuit layer 26 is underneath the tongue 20.

The terminal pads 32 are respectively mounted on the arms 29 of the insulated circuit layer 26. Each terminal pad 32 includes a pad surface 46 which, in the overhead view of FIG. 4, faces upward. The overhead view of FIG. 4 shows that each of the masses of structural adhesive 44 can extend the full width (along the X axis) of the microactuator 22. For example, the distal and proximal edges of the masses of structural adhesive 44 extend distally and proximally beyond the distal and proximal edges of the microactuator 22, respectively. Alternatively, the distal and proximal edges of the masses of structural adhesive 44 can be aligned with the distal and proximal edges of the microactuator 22, respectively.

The microactuator 22 has been removed in the overhead view of FIG. 5, relative to FIG. 4. The overhead view of FIG. 5 shows that the masses of conductive adhesive 34 are entirely contained on the terminal pad 32, and specifically on the pad surface 46. The overhead view of FIG. 5 shows that the masses of structural adhesive 44 can extend laterally from the terminal pads 32 to the inner portions 38 of the spring arms 30, respectively. Alternatively, each mass of structural adhesive 44 may only extend laterally from a terminal pad 32 to an insulator surface 48 of the insulated circuit layer 26 (the insulator surface 48, discussed further in connection with FIG. 6, is located between the terminal pad 32 and the inner portion 38 of the spring arm 30) but not extend to the inner portion 38. In another embodiment, each mass of structural adhesive 44 may be disposed on the inner portion 38 of the spring arm 30 and/or the insulator surface 48 but not be disposed on the terminal pad 32.

FIG. 6 shows the overhead view of the flexure 4 with the masses of conductive adhesive 34 and the masses of structural adhesive 44 removed. The footprint of the insulated circuit layer 26 can generally correspond to the footprint of the stainless steel layer 24, however, as shown in FIG. 6, some differences exist in their respective footprints.

The overhead view of FIG. 6 shows that the terminal pads 32 are generally oval-shaped. The terminal pads 32 can be in the form of other shapes, such as rectangles orientated along the X axis. The terminal pads 32 are on opposite lateral sides (e.g., left and right) of the flexure 4. The terminal pads 32 are both located at the same longitudinal (e.g., along the X axis) location along the flexure 4. The terminal pads 32 may not be in contact with the stainless steel layer 24, and in particular can be electrically isolated from the stainless steel layer 24. A base portion of each terminal pad 32 (e.g., below the pad surface 46) can be formed from a first metal while the pad surface 46 can be formed from a second metal. The first metal can be copper or stainless steel. The second metal can be gold. The second metal, in forming the pad surface 46, can be plated on the first metal of the base.

On each lateral side of the flexure 4, a gap exists between the terminal pad 32 and the inner portion 38 of the spring arm 30. The gap is defined, at least in part, by insulator surface 48. The insulator surface 48 is part of the insulated circuit layer 26 and is formed from insulation material 27. This gap can electrically separate the terminal pad 32 (and associated electrical circuit) from the stainless steel layer 24 which can function as an electrical ground.

FIGS. 7-10 illustrate assembly steps for forming the flexure 4. In particular FIGS. 7-10 show sequential assembly steps from the perspective of a cross sectional view along line AA of FIG. 6. It will be appreciated that the cross-sectional view along line AA shows one lateral side (e.g., the left side) of the flexure 4, and that identical steps can be simultaneously carried out on the other lateral side (e.g., the right side) of the flexure 4 in a manner that mirrors the steps carried out on the illustrated side to mount both lateral sides of the microactuator 22.

Figure 7:
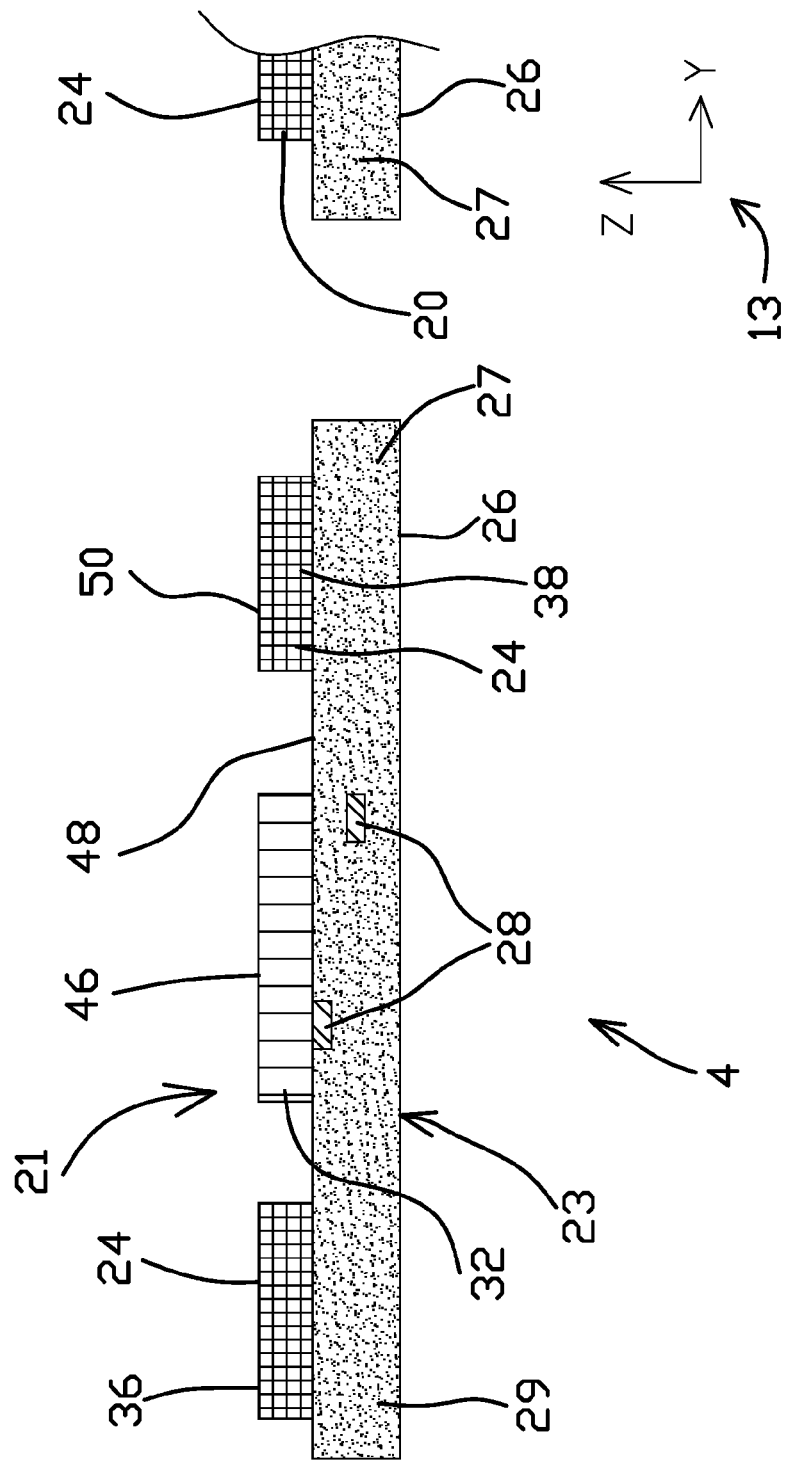
FIG. 7 is a cross sectional view along line AA of FIG. 6 of a partially assembled flexure embodiment.

In FIG. 7, the flexure 4 is shown as including only the stainless steel layer 24 coupled with the insulated circuit layer 26. The view of FIG. 7 shows the outer portion 36 and inner portion 38 of the spring arms 30, as well as the tongue 20, of the stainless steel layer 24. The top side 21 and the bottom side 23 of the flexure 4 are shown in FIG. 7. The insulated circuit layer 26 is formed from traces 28 and insulation material 27. Insulation material 27 can be an insulative polymer, such as polyamide, amongst other options. While two traces 28 are shown in FIG. 7, it can be understood that any number of traces can be embedded within the insulation material 27 (e.g., one, three, four, or more). The traces 28 can alternatively extend along a surface of the insulation material 27. One trace 28 (on the left lateral side) makes contact with the terminal pad 32 to form an electrical connection between the one trace 28 and terminal pad 32. As shown in FIG. 7, the one trace 28 makes contact with a bottom side of the terminal pads 32, the bottom side of the terminal pads 32 facing, and in contact with, the top side of the insulated circuit layer 26.

Figure 8:
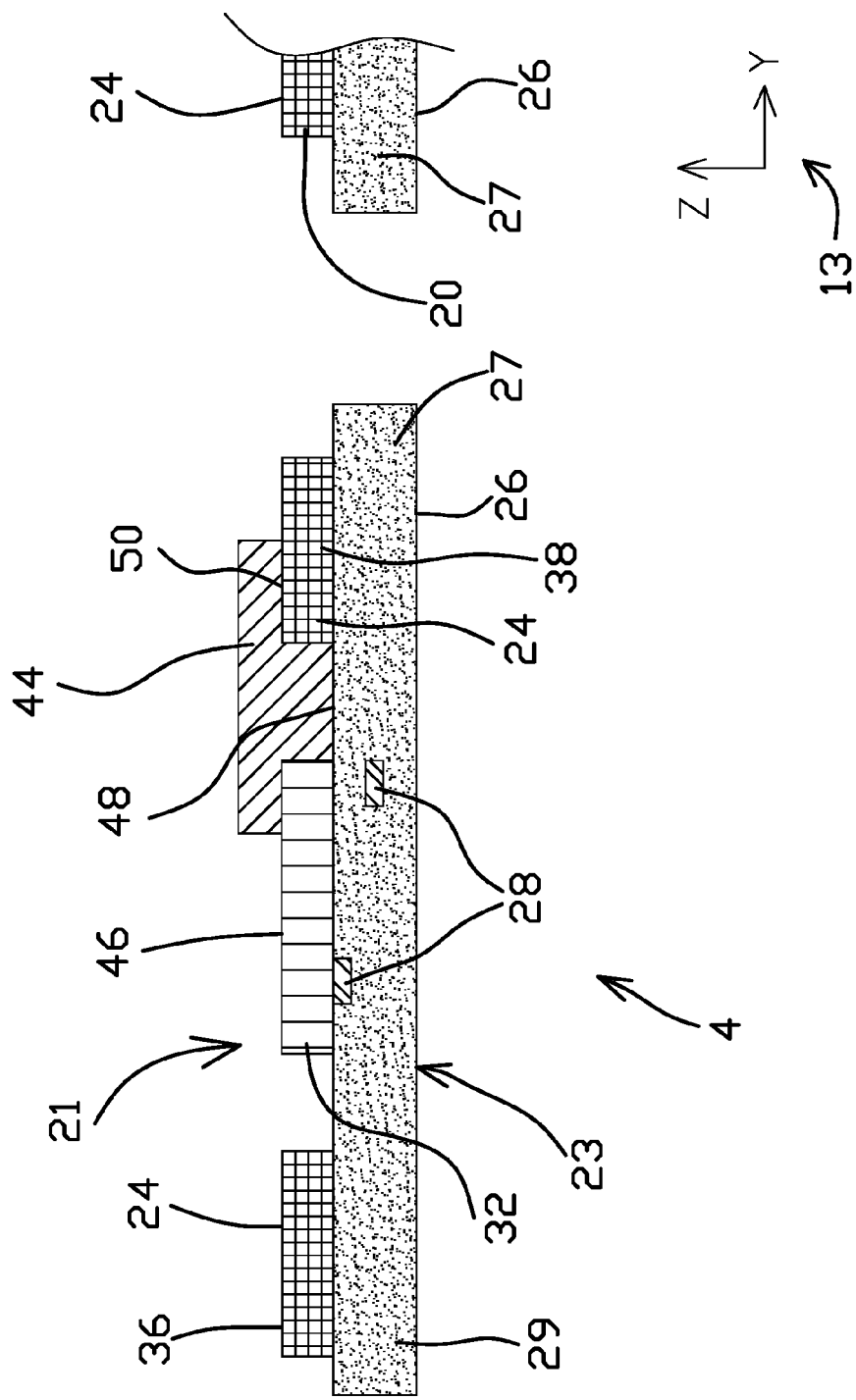
FIG. 8 is the same cross sectional view as FIG. 7 but when the embodiment is in a further assembled state.

FIG. 8 shows the same cross-sectional view as FIG. 7, except that a mass of structural adhesive 44 has been deposited on the top side 21 of the flexure 4 in a later assembly step. The mass of structural adhesive 44 is preferably not electrically conductive. The mass of structural adhesive 44 can be a polymeric electrical insulator, such as various types of epoxy. The mass of structural adhesive 44 can be dispensed from a nozzle of a conventional adhesive dispenser. As shown in FIG. 8, the mass of structural adhesive 44 is on the terminal pad 32. In particular, the mass of structural adhesive 44 is in contact with the pad surface 46. The mass of structural adhesive 44 is further on the insulated circuit layer 26. In particular, the mass of structural adhesive 44 is in contact with the insulator surface 48. The mass of structural adhesive 44 is also on the stainless steel layer 24. In particular, the mass of structural adhesive 44 is on the inner portion 38 of the spring arm 30. The mass of structural adhesive 44 is in contact with the metal surface 50 of the inner portion 38 of the spring arm 30. It will be understood that an additional mass of structural adhesive 44 can be dispensed in an identical manner on the other lateral side of the flexure 4.

The mass of structural adhesive 44 is applied in a wet state. A wet state, as used herein, refers to an adhesive that is entirely or almost entirely uncured. An adhesive in a wet state may have no solidification. An adhesive in a wet state may flow along a surface. An adhesive in a wet state may wick along surfaces (e.g., due to capillary action). An adhesive in a wet state may be able to be easily smeared or smudged, the wet adhesive not being capable of brittle fracture. In some embodiments, an adhesive in a wet state has been recently dispensed and no curing energy (e.g., directed or intense energy) has been applied to the adhesive.

Figure 9:
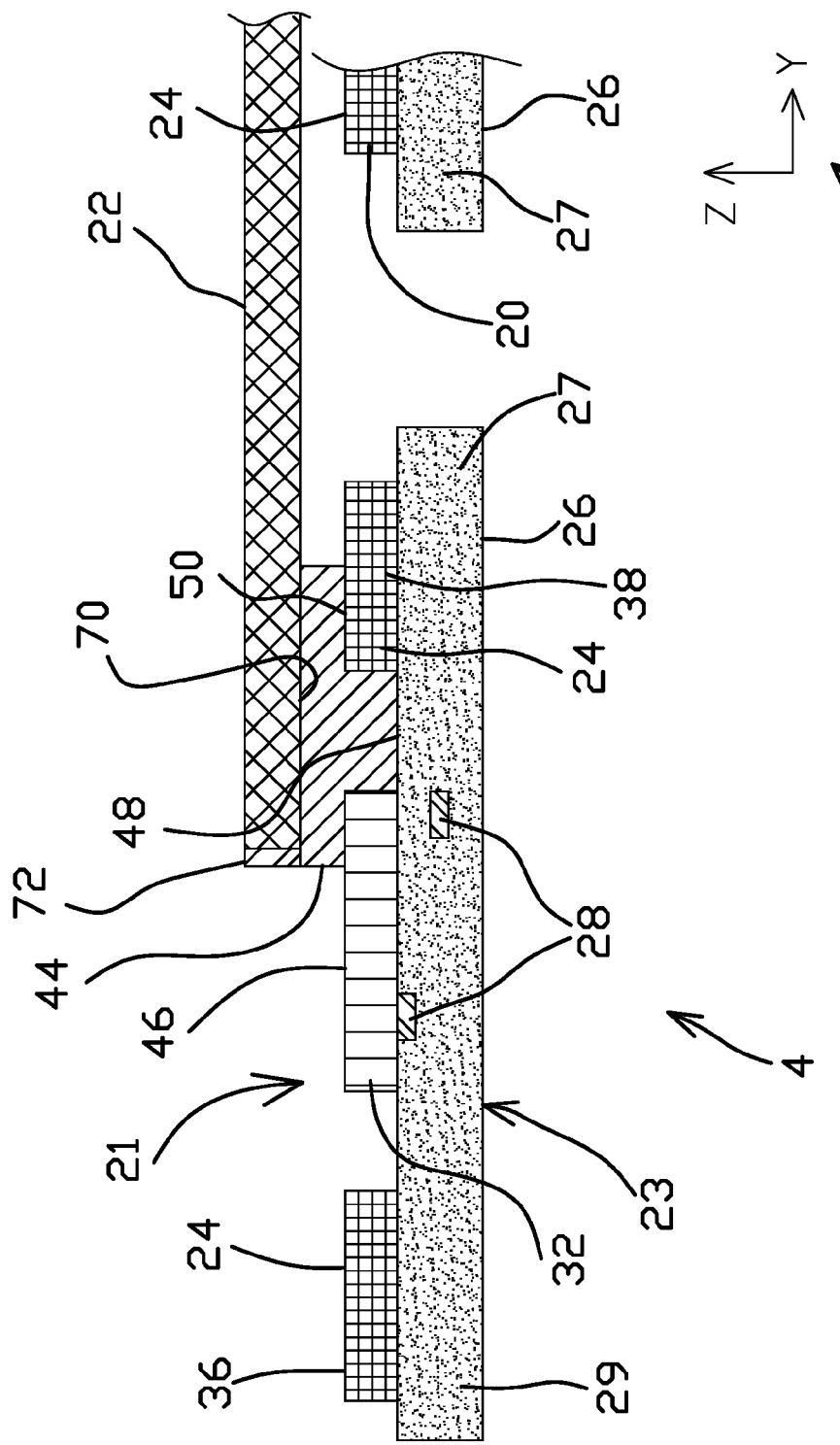
FIG. 9 is the same cross sectional view as FIG. 8 but when the embodiment is in a further assembled state.

FIG. 9 shows the same cross-sectional view as FIG. 8, except that the microactuator 22 and has been mounted on the flexure 4. It will be understood that the left side of the microactuator 22 is shown in FIG. 9, and that the right side of the microactuator 22 can be mounted in identical fashion on the right side of the flexure 4 over the terminal pad 32 on the right side of the flexure 4. As shown, the bottom surface 70 of the microactuator 22 makes contact with the mass of structural adhesive 44 (e.g., a top surface of the mass of structural adhesive 44). The mass of structural adhesive 44, still in a wet state, conforms to the bottom surface 70 of the microactuator 22. The mass of structural adhesive 44 may deform and spread-out laterally in response to the weight of the microactuator 22. However, the mass of structural adhesive 44 may have sufficient viscosity to hold up the microactuator 22 and prevent the weight of the microactuator 22 from entirely squeezing out the structural adhesive 44 such that the bottom of the microactuator 22 does not contact the pad surface 46, the metal surface 50, and/or the stainless steel layer 24. As shown in FIG. 9, the lateral ends of the microactuator 22 and the mass of structural adhesive 44 are aligned, however in some other embodiments, the mass of structural adhesive 44 may extend laterally beyond the end of the microactuator 22 or the mass of structural adhesive 44 may be recessed underneath the microactuator 22 such that the microactuator 22 extends laterally beyond the structural adhesive 44.

The microactuator 22 is mounted on the mass of structural adhesive 44 while the mass of structural adhesive 44 is in a wet state. After the mounting of the microactuator 22, a partial curing step is performed. The partial cure step can comprise the brief application of focused and/or intense curing energy. Curing energy can comprise the application of heated air (e.g., from a nozzle that blows heated air or by placement of the assembly in an oven, such as a box or conveyor oven), or the application of radiation (e.g., infrared light), among other options. In one example, the mass of structural adhesive 44 may be partially cured by exposure to air heated to 150 degrees centigrade for two seconds. In another option, the mass of structural adhesive 44 may be partially cured by exposure to air heated to 130 degrees centigrade for 32 seconds. "Partially cured" as used herein refers to a state of a mass of adhesive that, though exposure to curing energy, is no longer fully wet but after the exposure is still not fully cured.

The partial curing step partially cures, or at least partially solidifies, the mass of structural adhesive 44 but leaves a substantial portion of the mass of structural adhesive 44 uncured. The goal of the partial cure step is to cause the structural adhesive 44 to maintain its position while leaving most of the mass of structural adhesive 44 uncured. The partial cure step has several benefits, which will be described further herein.

In some embodiments, the partial cure step only cures a thin surface layer of the mass of structural adhesive 44. For example the partial cure step can form a skin layer on the mass of structural adhesive 44 that has higher viscosity than the wet structural adhesive and that can contain, within the skin, the remaining wet mass of structural adhesive 44. In some cases, the partial curing step may cure less than 5% (by weight or volume) of the mass of structural adhesive 44. A partial curing step can comprise the application of substantially less energy than the minimum amount of energy required to fully cure the mass of structural adhesive 44.

It is noted that the partial curing steps is carried out while the masses of structural adhesive are between the flexure 4 and the microactuator 22, and the curing energy can be applied to the microactuator 22 and the whole of the partially assembled flexure 4. For example, the partially assembled flexure 4 can be sent through a conveyer over, the partial curing step complete when the partially assembled flexure 4 exits the conveyer oven.

Figure 10:
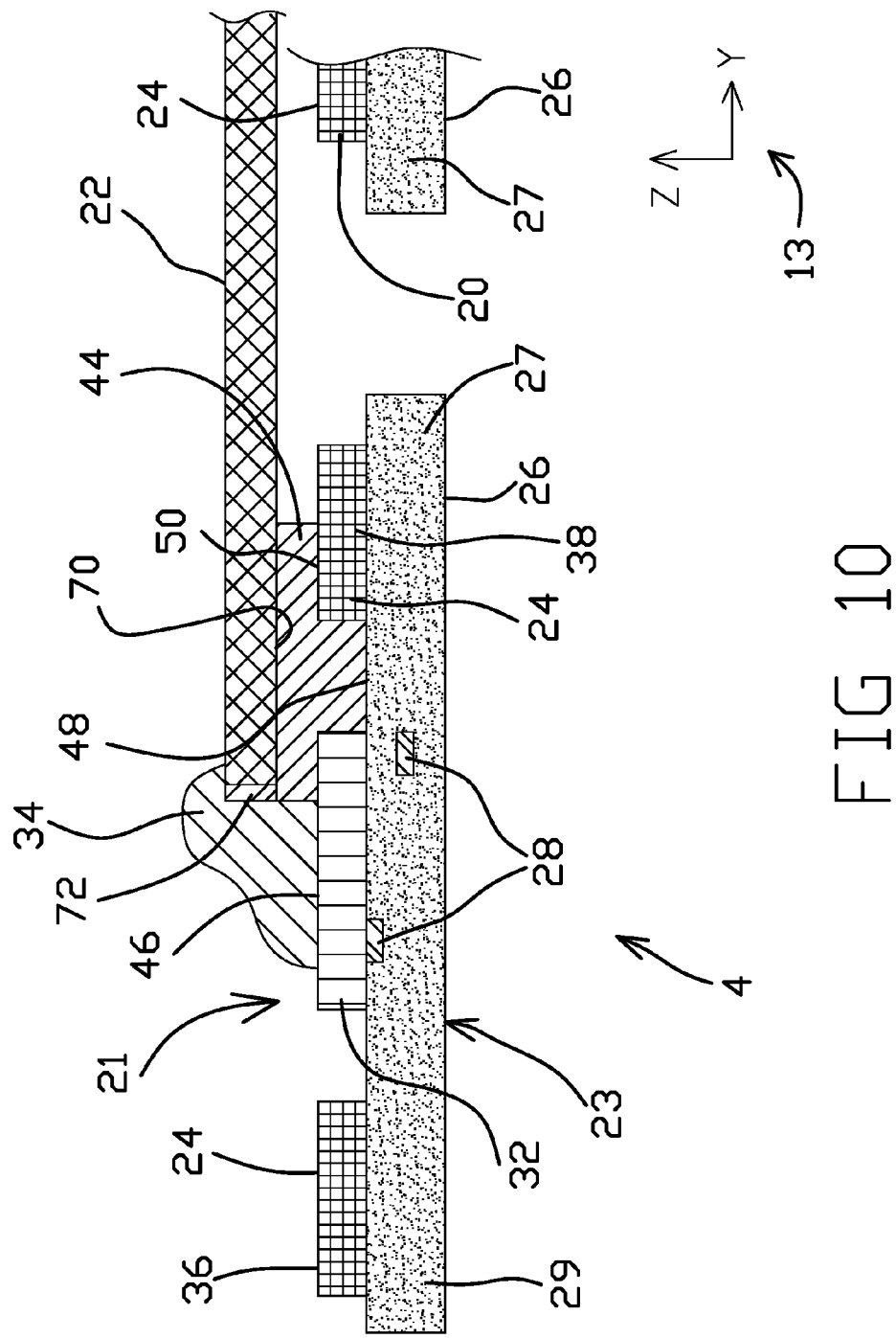
FIG. 10 is the same cross sectional view as FIG. 9 but when the embodiment is in a further assembled state.

FIG. 10 shows the same cross-sectional view as FIG. 9, but after application of a mass of conductive adhesive 34. The mass of conductive adhesive 34 is deposited after the partial cure step is performed, and therefore the mass of conductive adhesive 34 is not subject to the curing energy of the partial cure procedure. As shown in FIG. 10, the mass of conductive adhesive 34 is deposited on the pad surface 46 of the terminal pad 32. The mass of conductive adhesive 34 is also deposited to be in contact with the terminal 72 of the microactuator 22. The mass of conductive adhesive 34 establishes an electrical connection between the terminal pad 32 and the terminal 72, and thereby electrically connects the microactuator 22 to trace 28. As will be understood, a similar electrical connection is made on the opposite lateral side of the flexure 4 with another mass of conductive adhesive 34 to establish a second electrical connection between a second terminal of the microactuator 22 and a trace 28 or the stainless steel later 24 (as ground) to allow a signal to be applied across the terminals of the microactuator 22 to electrically activate the microactuator 22 to cause expansion or contraction of the microactuator 22.

After application of both masses of conductive adhesive 34, a full curing step can be carried out. In this full curing step, enough curing energy is applied to the masses of conductive adhesive 34 and the partially cured masses of structural adhesive 44 to fully cure all adhesives. For example, the curing of each mass of structural adhesive 44 is completed such that the mass is entirely cured and no wet or partially cured structural adhesive remains. When fully cured, the mass of structural adhesive 44 bonds the microactuator 22 to the flexure 4. The curing of each mass of conductive adhesive 34 is started and completed in this single step such that the mass is entirely cured and no wet or partially cured conductive adhesive remains. The entire flexure 4 can be placed inside an oven having an elevated temperature for a duration that is calculated to completely cure each of the masses of conductive adhesive 34 and the masses of structural adhesive 44. Alternatively, the masses of conductive adhesive 34 and the masses of structural adhesive 44 can be exposed to a source of curing radiation (e.g., an ultraviolet lamp) to provide a sufficient amount of intense energy to cure the masses of conductive adhesive 34 and the masses of structural adhesive 44. It is noted that it is desirable to not partially cure the masses of conductive adhesive 34 in a separate process from the full cure step. Conductive adhesive joints may have their highest yields when subject to one complete curing step instead of multiple curing steps in which an initial curing step only partially cures the adhesive. As such, the full curing step that cures the masses of conductive adhesive 34 is continuous and uninterrupted until a time at which the adhesives are calculated to be fully cured, and is preferably no longer than needed to achieve the full cure. "Fully cured" as used herein refers to a state of a mass of adhesive that, through exposure to curing energy, the entire volume of the mass is essentially completely cured. Further exposure of a mass of fully cured adhesive to curing energy would not perceptively improve the mechanical properties of the mass.

Before curing, each mass of conductive adhesive 34 is applied in a wet state. The mass of conductive adhesive 34 has a natural tendency to wick within the narrow space between the bottom side 70 of the microactuator 22 and the top side 21 of the flexure 4 (specifically the pad surface 46, the insulator surface 48, and the metal surface 50), as further discussed herein in connection with FIG. 11. As shown in FIG. 10, the mass of structural adhesive 44 has formed a barrier which prevents or limits penetration of the wet mass of conductive adhesive 34 underneath the microactuator 22. It is due to the partial cure step, and the resulting partial curing and increased rigidity of the mass of structural adhesive 44, that the mass of structural adhesive 44 forms a dam to prevent or limit such movement of the mass of conductive adhesive 34. Therefore, the mass of structural adhesive 44 can function as an electrically insulative barrier between the mass of conductive adhesive 34 and an electrically conducive element (e.g., the stainless steel layer 24).

Figure 11:
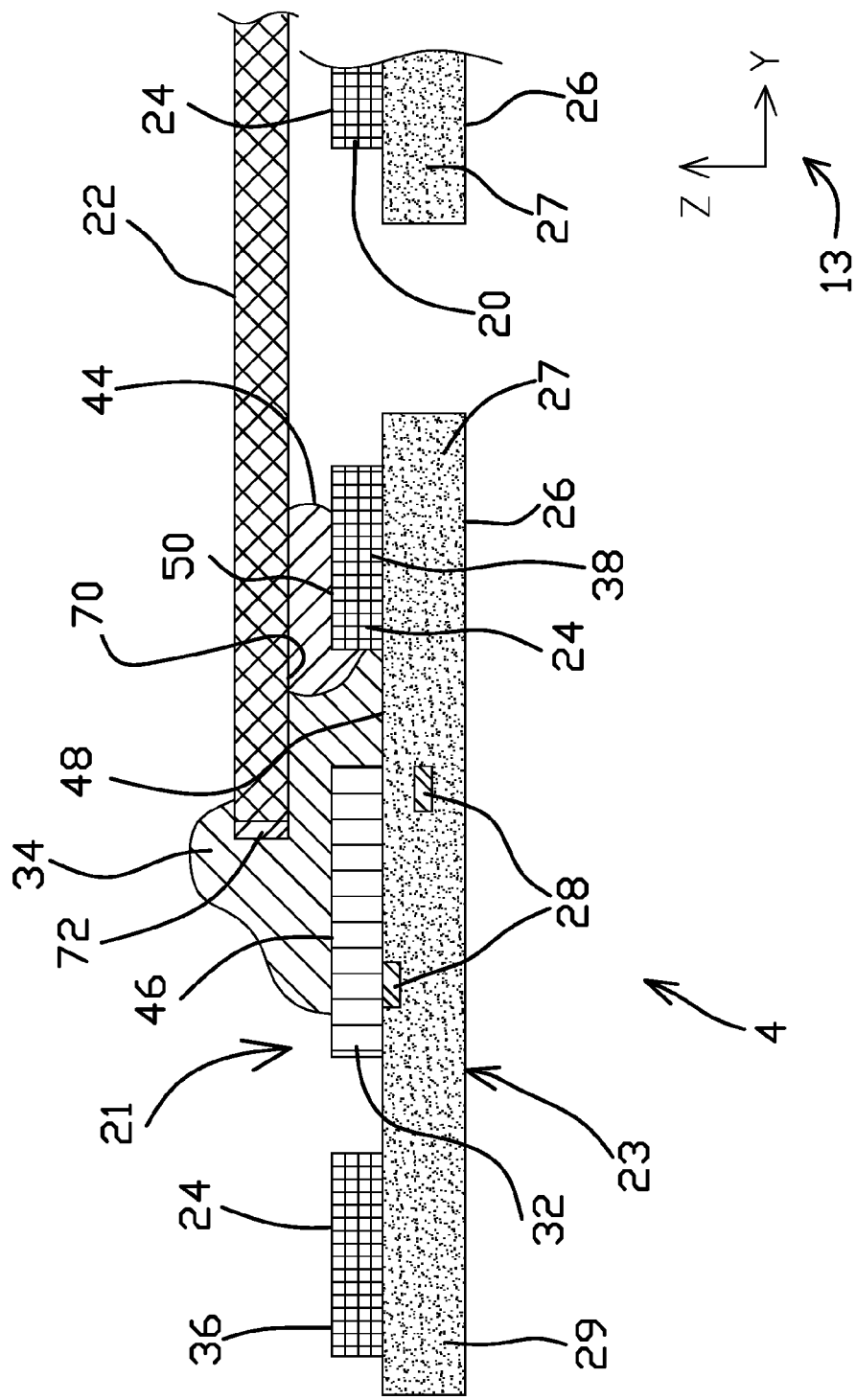
FIG. 11 is the same cross sectional view as FIG. 10 but shows an alternative configuration due to a step being omitted.

FIG. 11 is a cross-sectional view of an alternative example, relative to the example shown in FIG. 10, in which the structural adhesive 44 was not subject to a partial cure step. In this example, the entirety of the mass of structural adhesive 44 was wet upon application of the mass of conductive adhesive 34. Being that the mass of structural adhesive 44 is easily movable when wet, the tendency of the wet conductive adhesive 34 to achieve a lower surface energy state causes the wet conductive adhesive 34 to wick between the narrow space between the bottom side 70 of the microactuator 22 and the top side 21 of the flexure 4 (specifically, the pad surface 46, the insulative surface 48, and the metal surface 50) and displace the structural adhesive 44. As shown in FIG. 11, the mass of structural adhesive 44 is pushed laterally inward (e.g., further over the metal surface 50) by the inward movement of the conductive adhesive 34. The partial curing of the mass of structural adhesive 44 increases the rigidity of the mass of structural adhesive 44 sufficient to resist the mechanical force imparted on the mass of structural adhesive 44 by the wet mass of conductive adhesive 34.

The penetration of the conductive adhesive 34 underneath the microactuator 22 can be of particular concern because of the existence of electrically conductive elements underneath the microactuator 22. For example, as shown in FIG. 11, the mass of conductive adhesive 34 has made contact with the stainless steel layer 24 at the inner portion 38 of the spring arms 30. This creates an electrical short from one of the traces 28 to the stainless steel layer 24 thereby substantially diminishing if not entirely eliminating an electrical potential that could otherwise develop across the terminals 72 of the microactuator 22. In an alternative scenario, the conductive adhesive 34 loses contact with the terminal 72 of the microactuator 22 does to being drawn below the microactuator 22 due to the described wicking action such that, regardless of whether electrical shorting occurs elsewhere, a drive signal cannot be applied across the terminals 72 of the microactuator 22. The dam formed by the partially cured mass of structural adhesive 44 therefore keeps conductive adhesive where it is needed (e.g., bridging between the pad surface 46 of the terminal pad 32 and the terminal 72 of the microactuator 22) and prevents it from going where it is unwanted (e.g., contacting the stainless steel layer 24), thus increasing manufacturing yield.

Referring back to FIG. 10, it is noted that the dam formed by the mass of structural adhesive 44, when partially cured, can entirely fill the lateral opening between the microactuator 22 and the flexure 4. More specifically, the mass of structural adhesive 44 can extend from the pad surface 46 to the bottom side 70 of the microactuator 22. Additionally or alternatively, at a location recessed from the lateral edge of the microactuator 22, the mass of structural adhesive 44 can extend from the insulator surface 48 to the bottom side 70 of the microactuator 22. In at least these ways, the mass of structural adhesive 44 occupies the vertical height (e.g., along the Z axis) between the flexure 4 and the microactuator 22. Furthermore, the mass of structural adhesive 44 can extend along the full width of the microactuator 22 and/or the mass of conductive adhesive 34. For example, as measured along the X axis in FIG. 4, a mass of structural adhesive 44 can extend both proximal and distal of the microactuator 22 and/or of a mass of conductive adhesive 34 or can extend to the proximal and distal edges of the microactuator 22 and/or of the mass of conductive adhesive 34. As such, a mass of conductive adhesive 34 can contact a wall (e.g., parallel with a plane formed by the Z-X axes) formed by a mass of structural adhesive 44, the wall having an equivalent or greater expanse than that of the mass of conductive adhesive 34. This expanse of the wall of the mass of the structural adhesive 44, when partially cured, provides no space for the mass of conductive adhesive 34 to pass around the mass of the structural adhesive 44.

Figure 12:
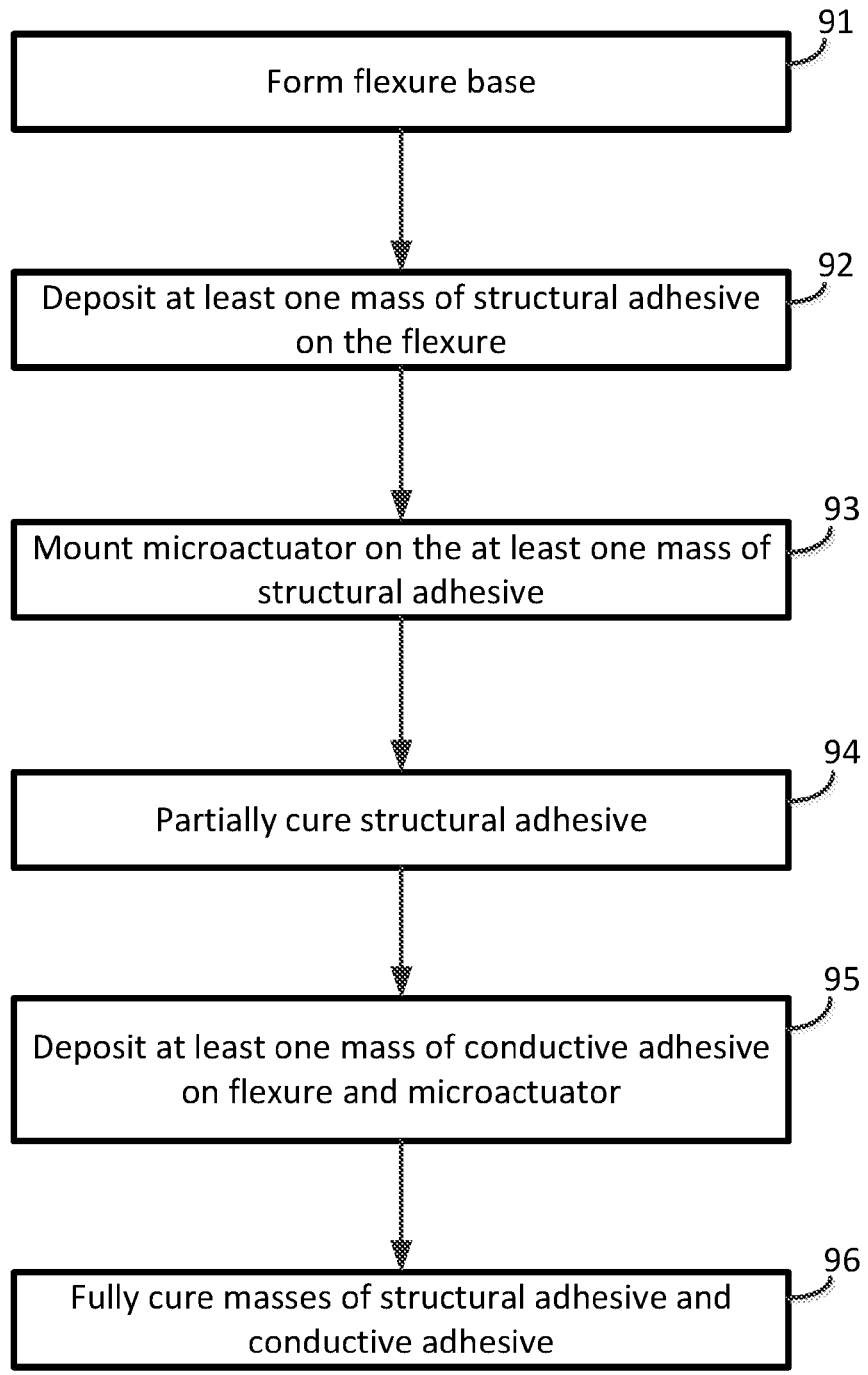
FIG. 12 is a flowchart of a method for assembling a flexure.

FIG. 12 is a flowchart showing steps for assembly of the suspension component. The method includes forming 91 a flexure. The flexure can be the flexure 4 shown herein or other flexure. The flexure can be in a partial state assembly. The flexure can be formed by any known techniques.

The method further includes depositing 92 at least one mass of structural adhesive on the flexure. The mass of structural adhesive can be deposited at one or more locations. For example, two different masses of structural adhesive can be deposited at two different locations on the flexure. The at least one mass of structural adhesive is deposited 92 in a wet state.

The method further includes mounting 93 a microactuator on the at least one mass of wet structural adhesive. The at least one mass of wet structural adhesive can be the only components on which the microactuator rests. In some cases, the microactuator does not contact a polyamide, stainless steel, and/or other layer of the flexure due to the presence of the at least one mass of structural adhesive.

The method further includes partially curing 94 the at least one mass of structural adhesive. It is noted that the step of partially curing 94 does not completely cure the at least one mass of structural adhesive. Preferably, the partial curing 94 cures only as much of each mass of structural adhesive as necessary to prevent the mass from flowing. As discussed previously, the energy for the partial curing 94 can be delivered by a brief exposure of the partially assembled the flexure to an oven or other source of heated air, radiation energy, or other type of energy that facilitates or accelerate the curing process.

The method further includes depositing 95 at least one mass of conductive adhesive on the flexure. The at least one mass of conductive adhesive can be placed in contact with the at least one partially cured mass of structural adhesive, respectively. The conductive adhesive is the deposited 95 and a wet state that is capable of flowing. Each mass of partially cured structural adhesive can inhibit movement of the wet conductive adhesive, the partially cured structural adhesive thereby serving as a dam. In some embodiments, the partially cured structural adhesive can limit or prevent the penetration of the at least one mass of conductive adhesive in a space between the microactuator and the flexure (along which the at least one mass of conductive adhesive would wick).

The method further includes fully curing 96 the masses of structural adhesive and conductive adhesive. The step of fully curing 96 can be a continuous application of high-energy that cures the respective masses. As discussed previously, the energy for the full curing 96 can be delivered by a continuous and uninterrupted exposure of the partially assembled flexure to an oven or other source of heated air, radiation energy, or other type of energy that facilitates or accelerate the curing process. Relative to the partial curing 94 step, the full curing 96 step can comprise a longer and/or more intense exposure to the curing energy.

It is noted that it is desirable to partially cure 94 the structural adhesive before placing the conductive adhesive on the flexure, instead of just fully curing the structural adhesive before placing the conductive adhesive on the flexure, for several reasons. The first is that it is desirable to limit the exposure of the structural adhesive and the microactuator to only as much curing energy as necessary because the energy needed to fully cure the structural adhesive can be intense (e.g., comprising high heat that is substantially above normal operating temperature) and may degrade the integrity of joints and the microactuator. Second, the full curing 96 step takes a substantially longer time than the partial curing 94 step such that the processing time would be longer if two full curing cycles are required.

Although the present invention has been described with reference to preferred embodiments, those skilled in the art will recognize that changes can be made in form and detail without departing from the spirit and scope of the invention. For example, although described in connection with certain co-located DSA structures, microactuators and associated features described herein can be used in connection with other DSA structures, including other co-located DSA structures and/or non-co-located DSA structures, such as with baseplate 6 or loadbeam 8 mounted microactuators.

The following is claimed:

1. A flexure assembly, comprising:
   a flexure having a first surface and a second surface;
   a mass of structural adhesive disposed on the first surface, the mass of structural adhesive partially cured, the mass of structural adhesive is non-conductive;
   a microactuator mounted on the flexure, the microactuator having a bottom side and a terminal, the bottom side in contact with the mass of structural adhesive; and
   a mass of conductive adhesive disposed on the second surface, the mass of conductive adhesive in contact with the terminal and the mass of structural adhesive that is partially cured, the mass of conductive adhesive in a wet state.

2. The flexure assembly of claim 1, wherein the mass of structural adhesive blocks the mass of conductive adhesive from penetrating between an underside of the microactuator and the first surface.

3. The flexure assembly of claim 1, wherein the first surface is a structural metal layer of the flexure, the structural metal layer is formed from a first metal and the second surface is a terminal pad in electrical connection with a trace of the flexure, the terminal pad formed from a second metal that is different from the first metal.

* * * * *